(12) United States Patent
Liu et al.

(10) Patent No.: US 10,939,307 B2
(45) Date of Patent: Mar. 2, 2021

(54) METHOD AND APPARATUS FOR CALIBRATING CHANNEL BETWEEN RADIO REMOTE UNITS RRUS

(71) Applicant: Huawei Technologies Co., Ltd., Shenzhen (CN)

(72) Inventors: Guochen Liu, Shenzhen (CN); Quanzhong Gao, Shanghai (CN); Hui Huang, Shenzhen (CN); Chaoyi Yan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 7 days.

(21) Appl. No.: 16/204,514

(22) Filed: Nov. 29, 2018

(65) Prior Publication Data

US 2019/0098519 A1 Mar. 28, 2019

Related U.S. Application Data

(63) Continuation of application No. PCT/CN2016/084183, filed on May 31, 2016.

(51) Int. Cl.
| | |
|---|---|
| *H04W 24/02* | (2009.01) |
| *H04W 24/00* | (2009.01) |
| *H04B 17/14* | (2015.01) |
| *H04W 56/00* | (2009.01) |
| *H04W 88/08* | (2009.01) |

(52) U.S. Cl.
CPC ............ *H04W 24/02* (2013.01); *H04B 17/14* (2015.01); *H04W 24/00* (2013.01);
(Continued)

(58) Field of Classification Search
CPC . H04W 24/02; H04W 24/00; H04W 56/0015; H04W 88/085; H04B 17/14; Y02D 70/00
See application file for complete search history.

(56) References Cited

U.S. PATENT DOCUMENTS

| 2015/0085690 A1* | 3/2015 | Yi .......................... H04W 24/02 370/252 |
| 2015/0189669 A1* | 7/2015 | Huang ................... H04L 5/0035 370/329 |

(Continued)

FOREIGN PATENT DOCUMENTS

| CN | 101383798 A | 3/2009 |
| CN | 102315868 A | 1/2012 |

(Continued)

*Primary Examiner* — Peter P Chau
(74) *Attorney, Agent, or Firm* — Leydig, Voit & Mayer, Ltd.

(57) ABSTRACT

A method for calibrating a channel between radio remote unit (RRUs) includes: for each subcarrier in M subcarriers in full bandwidth, instructing, by a baseband unit (BBU), a reference RRU to transceive a calibration signal on the subcarrier by using a reference channel and a preset channel in a preset RRU, and calculating a calibration coefficient; and determining a first correspondence according to M calibration coefficients obtained by means of calculation, where the first correspondence includes a correspondence between a frequency of each subcarrier and the calibration coefficient on the subcarrier, 2≤M<N, N is a total quantity of subcarriers in the full bandwidth, and both M and N are integers.

16 Claims, 8 Drawing Sheets

(52) U.S. Cl.
CPC ...... *H04W 56/0015* (2013.01); *H04W 88/085* (2013.01); *Y02D 30/70* (2020.08)

(56) References Cited

U.S. PATENT DOCUMENTS

2015/0200740 A1* 7/2015 Yi ..................... H04J 11/0053
                                                                         370/329
2016/0099762 A1    4/2016  Wu et al.
2016/0308624 A1  10/2016  Rong et al.

FOREIGN PATENT DOCUMENTS

| | | |
|---|---|---|
| CN | 103338167 A | 10/2013 |
| CN | 103428125 A | 12/2013 |
| CN | 103457651 A | 12/2013 |
| CN | 103905353 A | 7/2014 |
| CN | 104218983 A | 12/2014 |
| CN | 104244296 A | 12/2014 |
| CN | 104378775 A | 2/2015 |
| CN | 104618930 A | 5/2015 |
| CN | 105637775 B | 5/2019 |
| EP | 2894794 A1 | 7/2015 |
| JP | 2015519843 A | 7/2015 |
| JP | 2015532051 A | 11/2015 |
| JP | 2015532056 A | 11/2015 |
| JP | 2018-562638 | 10/2020 |
| WO | 2014039098 A1 | 3/2014 |
| WO | 2014101808 A1 | 7/2014 |
| WO | WO-2014198233 A1 * 12/2014 ........... H04B 7/0619 |

* cited by examiner

METHOD AND APPARATUS FOR CALIBRATING CHANNEL BETWEEN RADIO REMOTE UNITS RRUS

CROSS-REFERENCE TO RELATED APPLICATIONS

This application is a continuation of International Application No. PCT/CN2016/084183, filed on May 31, 2016, the disclosure of which is hereby incorporated by reference in its entirety.

TECHNICAL FIELD

The present invention relates to the communications field, and in particular, to a method and an apparatus for calibrating a channel between RRUs.

BACKGROUND

In joint transmission (JT) transmission technologies, multiple cells used to cooperatively send a signal to a same terminal device form a coordinating cell set. Each cell in the coordinating cell set is a coordinating cell. A base station sends the signal to the terminal device by using multiple channels of the multiple coordinating cells. In a time division duplex (Time Division Duplexing, TDD) mode, in-phase addition is performed, at the terminal device side according to reciprocity of uplink and downlink channels in the TDD mode, on the signal sent by using the channels of the coordinating cells, so as to improve received signal quality of the terminal device and improve a system throughput. In an actual system, different channels of the base station are respectively introduced for uplink and downlink channels, and these channels usually have different responses. Therefore, to ensure reciprocity of the uplink and downlink channels in the TDD mode, the channels need to be calibrated, so that response ratios of transceiving channels corresponding to antennas are the same.

A distributed base station in an LTE system includes a baseband unit (Base Band Unit, BBU) and a radio remote unit (RRU). An RRU is a unit in a coordinating cell used to transceive a signal. A coordinating cell set includes multiple RRUs. Multiple RRUs in a coordinating cell set are used to send a same signal to a terminal device by using channels. The multiple RRUs may be RRUs in a same distributed base station, or RRUs in different distributed base stations.

When a channel between multiple RRUs in a coordinating cell set is to be calibrated, an RRU is selected as a reference RRU, a channel in the reference RRU is selected as a reference channel, and a transceiving response ratio of the reference channel in the reference RRU is used as a reference, to calibrate a transceiving response ratio of a preset channel in a preset RRU. The preset RRU is another RRU, different from the reference RRU, in all RRUs included in the coordinating cell set. A channel in the preset RRU is the preset channel. It is assumed that an RRU1 is a reference RRU, a channel 1 in the RRU1 is a reference channel, and a channel 1 in an RRU2 is a preset channel, which needs to be calibrated, in a preset RRU. The RRU1 sends a calibration reference signal $S_1$ to the channel 1 in the RRU2 on any subcarrier in operating bandwidth at a particular time by using the channel 1, and it is assumed that the RRU2 receives a signal $Y_1$ on the subcarrier by using the channel 1. The RRU2 sends a calibration reference signal $S_2$ to the RRU1 on the subcarrier at another particular time by using the channel 1, and it is assumed that the RRU1 receives a signal $Y_2$ on the subcarrier by using the channel 1. Then a BBU obtains, by means of calculation, a calibration coefficient $\alpha_{1,2}$ of the channel 1 in the RRU2 relative to the channel 1 in the RRU1 on the subcarrier for the channel 1 in the RRU1:

$$\alpha_{1,2} = \frac{Y_1/S_1}{Y_2/S_2}$$

The BBU calibrates a transceiving response ratio of the channel 1 in the RRU2 on the subcarrier according to the calibration coefficient. When multiple preset channels need to be calibrated according to the reference channel in the reference RRU, the reference RRU successively calibrates different preset channels in full bandwidth by using the foregoing method. The multiple preset channels may be multiple channels in a same preset RRU, or multiple channels in different preset RRUs. In this way, calibration of channels between all RRUs is implemented.

When a channel between two RRUs is to be calibrated, a calibration signal needs to be transceived on each subcarrier in operating bandwidth by using the channel between the two RRUs, so as to calculate a calibration coefficient $\alpha_{1,2}$ on each subcarrier. Consequently, a relatively large quantity of resources are consumed.

SUMMARY

Embodiments of the present invention provide a method and an apparatus for calibrating a channel between RRUs, to solve a problem of relatively high resource consumption caused because a BBU needs to instruct an RRU to transceive a calibration signal on each subcarrier during calibration of a channel between RRUs. The technical solutions are as follows:

According to a first aspect, a method for calibrating a channel between RRUs is provided, where the method includes: for each subcarrier in M subcarriers in full bandwidth, instructing, by a BBU, a reference RRU to transceive a calibration signal on the subcarrier by using a reference channel and a preset channel in a preset RRU, and calculating, by the BBU, a calibration coefficient of the preset channel in the preset RRU relative to the reference channel in the reference RRU on the subcarrier, where 2≤M<N, N is a total quantity of subcarriers in the full bandwidth, and both M and N are integers; determining, by the BBU, a first correspondence according to M calibration coefficients obtained by means of calculation, where the first correspondence includes a correspondence between a frequency of each subcarrier in the full bandwidth and a first calibration coefficient, and the first calibration coefficient is the calibration coefficient of the preset channel in the preset RRU relative to the reference channel in the reference RRU on the subcarrier; and calibrating, by the BBU, a transceiving response ratio of the preset channel in the preset RRU on each subcarrier according to the first correspondence.

In this possible implementation, a BBU only needs to instruct a reference RRU to transceive a calibration signal on some subcarriers in a full bandwidth by using a reference channel and a preset channel in a preset RRU, and obtain calibration coefficients by means of calculation, so that the BBU can determine a calibration coefficient of the preset channel in the preset RRU relative to the reference channel in the reference RRU in the full bandwidth, and calibrate a transceiving response ratio of the preset channel in the preset RRU in the full bandwidth. When the transceiving response ratio of the preset channel in the preset RRU is calibrated in the full bandwidth, the calibration signal does not need to be transceived on each subcarrier. Therefore, this resolves a problem of relatively high resource consumption caused because a calibration signal needs to be transceived on each subcarrier during calibration of a channel between RRUs, and reduces resource consumption. In addition, the calibration signal needs to be transmitted only on some subcarriers, thereby reducing power of the calibration signal.

With reference to the first aspect, in a first possible implementation of the first aspect, the determining, by the BBU, a first correspondence according to M calibration coefficients obtained by means of calculation includes: determining an initial phase and a delay of a calibration coefficient of the preset channel in the preset RRU relative to the reference channel in the reference RRU in the full bandwidth according to the M calibration coefficients; and determining, by the BBU, the first correspondence according to the initial phase and the delay.

With reference to the first possible implementation of the first aspect, in a second possible implementation of the first aspect, the determining, by the BBU, an initial phase and a delay of a calibration coefficient of the preset channel in the preset RRU relative to the reference channel in the reference RRU in the full bandwidth according to the M calibration coefficients includes: for each calibration coefficient in the M calibration coefficients, determining, by the BBU, a phase of the calibration coefficient; and determining, by the BBU, the initial phase and the delay of the calibration coefficient of the preset channel in the preset RRU relative to the reference channel in the reference RRU in the full bandwidth according to M phases and a frequency of the subcarrier corresponding to each calibration coefficient.

With reference to the first possible implementation of the first aspect or the second possible implementation of the first aspect, in a third possible implementation of the first aspect, the determining, by the BBU, the first correspondence according to the initial phase and the delay includes: determining, by the BBU, phases $\varphi_{fn}$ of the calibration coefficients of the preset channel in the preset RRU relative to the reference channel in the reference RRU in the full bandwidth according to the initial phase, the delay, and frequencies $f_n$ of the N subcarriers, where $1 \leq n \leq N$, and n is an integer; and determining the first correspondence according to the phases $\varphi_{fn}$.

With reference to the first aspect, the first possible implementation of the first aspect, the second possible implementation of the first aspect, and the third possible implementation of the first aspect, in a fourth possible implementation of the first aspect, a difference between frequencies of any two subcarriers in the M subcarriers is less than a preset frequency threshold.

With reference to the first aspect, the first possible implementation of the first aspect, the second possible implementation of the first aspect, and the third possible implementation of the first aspect, in a fifth possible implementation of the first aspect, the preset RRU includes at least two preset channels, and the calculating, by the BBU, a calibration coefficient of the preset channel in the preset RRU relative to the reference channel in the reference RRU on the subcarrier includes: calculating, by the BBU on a same time domain resource, a calibration coefficient of each preset channel relative to the reference channel in the reference RRU on a subcarrier corresponding to the preset channel, where frequencies of subcarriers corresponding to different preset channels in the preset RRU are different.

In this possible implementation, multiple preset channels in a preset RRU use M different subcarriers, so that a BBU can instruct to transceive a calibration signal concurrently on different subcarriers by using a reference channel in a reference RRU and the multiple preset channels in the preset RRU at the same time, so as to concurrently determine and obtain multiple first correspondences, and can calibrate transceiving response ratios of the multiple channels in the preset RRU according to the determined first correspondences. This resolves a problem of a relatively long calibration period caused because calibration signals need to be successively transceived for calibration when transceiving response ratios of a relatively large quantity of preset channels in the preset RRU need to be calibrated, and reduces a calibration period.

With reference to the first aspect, the first possible implementation of the first aspect, the second possible implementation of the first aspect, the third possible implementation of the first aspect, the fourth possible implementation of the first aspect, and the fifth possible implementation of the first aspect, in a sixth possible implementation of the first aspect, the method further includes: if a signal quality value between at least one RRU and other RRUs in K RRUs is greater than a preset threshold, using, by the BBU, an RRU with a largest signal quality value between the RRU and the other RRUs in the K RRUs, as the reference RRU, using any channel in the reference RRU as the reference channel, and using the other RRUs in the K RRUs as the preset RRU, where K≥3, and K is an integer.

With reference to the sixth possible implementation of the first aspect, in a seventh possible implementation of the first aspect, at least two preset RRUs are included, and the calculating, by the BBU, a calibration coefficient of the preset channel in the preset RRU relative to the reference channel in the reference RRU on the subcarrier includes: calculating, by the BBU on the same time domain resource, a calibration coefficient of a preset channel in each preset RRU relative to the reference channel in the reference RRU on a subcarrier corresponding to the preset channel in the preset RRU, where frequencies of subcarriers corresponding to preset channels in different preset RRUs are different.

In this possible implementation, preset channels in multiple preset RRUs use M different subcarriers, so that a BBU can instruct to transceive a calibration signal concurrently on different subcarriers by using a reference channel in a reference RRU and the preset channels in the multiple preset RRUs at the same time, so as to concurrently determine and obtain multiple first correspondences, and can calibrate transceiving response ratios of multiple channels in the preset RRUs according to the determined first correspondences. This resolves a problem of a relatively long calibration period caused when transceiving response ratios of channels of a relatively large quantity of preset RRUs need to be successively calibrated, implements that multiple pairs of RRUs can transceive a calibration signal at the same time and do not interfere with each other, and reduces a calibration period.

With reference to the first aspect, the first possible implementation of the first aspect, the second possible implementation of the first aspect, the third possible implementation of the first aspect, the fourth possible implementation of the first aspect, and the fifth possible implementation of the first aspect, in an eighth possible implementation of the first aspect, the method further includes: if signal quality values between each RRU and two neighboring RRUs in K RRUs are greater than a preset threshold, using, by the BBU, every alternate RRU in the K RRUs as the reference RRU, using any channel in the reference RRU as the reference channel, and using other RRUs in the K RRUs as the preset RRU, where each reference RRU is a reference RRU corresponding to two RRUs adjacent to the reference RRU, and K≥3; and the calibrating, by the BBU, a transceiving response ratio of the preset channel in the preset RRU on each subcarrier according to the first correspondence includes: determining, by the BBU, a second correspondence of a preset channel in each preset RRU relative to a reference channel in a primary reference RRU according to a first correspondence of the preset channel in the preset RRU relative to a reference channel in a reference RRU corresponding to the preset channel in the preset RRU, where the second correspondence includes a correspondence between the frequency of each subcarrier in the full bandwidth and a second calibration coefficient, the second calibration coefficient is a calibration coefficient of the preset channel in the preset RRU relative to the reference channel in the primary reference RRU on the subcarrier, and the primary reference RRU is any RRU in the K RRUs; and calibrating, by the BBU, the transceiving response ratio of the preset channel in the preset RRU on each subcarrier according to the determined second correspondence.

With reference to the eighth possible implementation of the first aspect, in a ninth possible implementation of the first aspect, at least two preset RRUs are included; and the calculating, by the BBU, a calibration coefficient of the preset channel in the preset RRU relative to the reference channel in the reference RRU on the subcarrier includes: calculating, by the BBU on the same time domain resource, a calibration coefficient of the preset channel in each preset RRU relative to a preset reference channel, where the calibration coefficient is a calibration coefficient of the preset channel in the preset RRU relative to the preset reference channel on a subcarrier corresponding to the preset channel in the preset RRU, the preset reference channel is a reference channel in a reference RRU corresponding to the preset RRU, and frequencies of subcarriers corresponding to preset channels in different preset RRUs are different.

In this possible implementation, preset channels in multiple preset RRUs use M different subcarriers, so that a BBU can instruct to transceive a calibration signal concurrently on different subcarriers by using a reference channel in a reference RRU and the preset channels in the multiple preset RRUs at the same time, so as to concurrently determine and obtain multiple first correspondences, and can calibrate transceiving response ratios of multiple channels in the preset RRUs according to the determined first correspondences. This resolves a problem of a relatively long calibration period caused when transceiving response ratios of channels of a relatively large quantity of preset RRUs need to be successively calibrated, implements that multiple pairs of RRUs can transceive a calibration signal at the same time and do not interfere with each other, and reduces a calibration period.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, and the ninth possible implementation of the first aspect, in a tenth possible implementation of the first aspect, frequencies of the M subcarriers corresponding to the preset channel in the preset RRU are different from frequencies of subcarriers corresponding to channels in RRUs in a cluster adjacent to a cluster in which the preset RRU is located, and a cluster is a set of RRUs whose required transceiving response ratio of channels are the same.

In this possible implementation, frequencies of subcarriers corresponding to channels in RRUs in multiple clusters are different. This implements that RRUs in adjacent clusters can transceive a calibration signal at the same time and do not interfere with each other, and reduces interference of the calibration signal between the RRUs in the adjacent clusters.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, the seventh possible implementation of the first aspect, the eighth possible implementation of the first aspect, the ninth possible implementation of the first aspect, and the tenth possible implementation of the first aspect, in an eleventh possible implementation of the first aspect, the method further includes: for each subcarrier in J subcarrier(s) in the full bandwidth, calculating a calibration coefficient of the preset channel in the preset RRU relative to the reference channel in the reference RRU on the subcarrier, where 1≤J≤N, and J is an integer; determining an updated initial phase of the calibration coefficient of the preset channel in the preset RRU relative to the reference channel in the reference RRU in the full bandwidth according to initial phase(s) of J calibration coefficient(s); and updating the first correspondence according to the updated initial phase and the delay.

In this possible implementation, when a delay changes, it can be determined to update a first correspondence only by re-measuring an initial phase of a calibration coefficient, without re-transceiving a calibration signal on a subcarrier and then determining a new first correspondence. This reduces a processing operation amount of a BBU.

According to a second aspect, an apparatus for calibrating a channel between RRUs is provided, where the apparatus includes a processor and a memory connected to the processor, the memory is configured to store one or more instructions, the instruction is executed by the processor after being instructed, and the processor executes the instruction to implement the method for calibrating a channel between RRUs provided in the foregoing first aspect.

According to a third aspect, an apparatus for calibrating a channel between RRUs is provided, where the apparatus for calibrating a channel between RRUs includes at least one unit, and the at least one unit is configured to implement the method for calibrating a channel between RRUs provided in the foregoing first aspect.

BRIEF DESCRIPTION OF DRAWINGS

To describe technical solutions in embodiments of the present invention more clearly, the following briefly describes the accompanying drawings. It will be appreciated that the accompanying drawings show merely some embodiments of the present invention, and a person of ordinary skill in the art may still derive other drawings from these accompanying drawings without creative efforts.

DESCRIPTION OF EMBODIMENTS

To make objectives, technical solutions, and advantages of the present invention clearer, the following further describes exemplary embodiments of the present invention in detail with reference to the accompanying drawings.

A "module" mentioned in this specification is a program or an instruction that is stored in a memory and that can be configured to implement some functions. A "unit" mentioned in this specification is a functional structure divided according to logic. The "unit" may be implemented by only hardware, or implemented by a combination of software and hardware.

Figure 1:
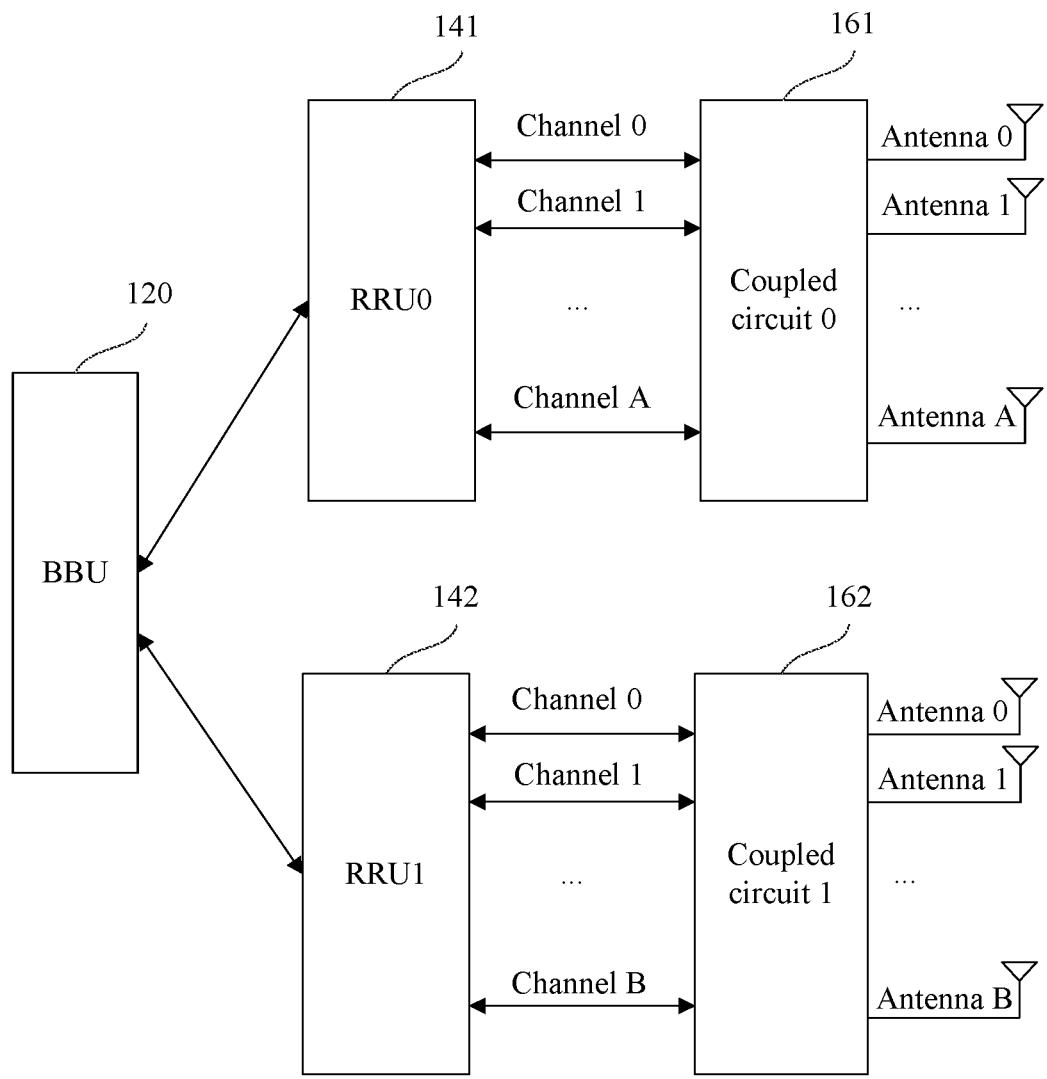
FIG. 1 is a schematic structural diagram of a distributed base station and a schematic structural diagram of a system for calibrating a channel between RRUs according to an example of an embodiment of the present invention.

An RRU in a method for calibrating a channel between RRUs provided in the embodiments is an RRU in a distributed base station. As shown in FIG. 1, FIG. 1 shows a schematic structural diagram of a distributed base station. The distributed base station includes a BBU 120, an RRU0 141, and an RRU1 142.

In a distributed base station, a BBU is connected to one or more RRUs by using an optical fiber or a microwave. In FIG. 1, that the BBU 120 is connected to the RRU0 141 and the RRU1 142 is merely used as an example for description.

The BBU 120 is configured to: process and transmit a baseband signal, and instruct the RRU0 141 and the RRU1 142 that are connected to the BBU 120 to perform operations such as sending a calibration signal and receiving a calibration signal over a particular channel.

One RRU includes multiple channels. A channel in an RRU is also referred to as a transceiving channel, an intermediate & radio frequency channel, or a service channel. Each channel is in a one-to-one correspondence with one antenna. For example, as shown in FIG. 1, the RRU0 includes a channel 0 to a channel A, and the channel 0 to the channel A are in a one-to-one correspondence with an antenna 0 to an antenna A. The RRU1 includes a channel 0 to a channel B, and the channel 0 to the channel B are in a one-to-one correspondence with an antenna 0 to an antenna B. A≥0, and B≥0. A quantity of channels included in one RRU is not limited in this embodiment.

An RRU is instructed by the BBU to transceive a signal over one or more channels by using an antenna corresponding to the channel. Different RRUs are configured to cooperatively transmit a signal to a same terminal device, or configured to transmit a signal to different terminal devices. For example, the BBU instructs the RRU0 to transmit a signal 1 to a terminal device 1 by using the channel 0, and instructs the RRU1 to transmit the signal 1 to the terminal device 1 by using the channel 0 and a channel 1. Alternatively, the BBU instructs the RRU0 to transmit a signal 1 to a terminal device 1 by using the channel 0, and instructs the RRU1 to transmit a signal 2 to a terminal device 2 by using the channel 0 and a channel 1.

During downlink signal transmission, the RRU operates in a transmit mode. The RRU performs processing operations such as modulation and demodulation, frequency conversion, radio frequency filtering, power amplification, and transmit filtering on the received baseband signal sent by the BBU, and sends a processed radio frequency signal to a terminal device or to another RRU by using one or more channels according to an instruction of the BBU.

During uplink signal transmission, the RRU operates in a receive mode. The RRU receives, by using the one or more channels, a signal sent by a terminal device or another RRU, performs processing operations such as filtering, low noise amplification, small radio frequency signal amplification and filtering, frequency conversion, analog-to-digital conversion, and digital intermediate frequency processing on the received signal, and then sends a processed signal to a BBU connected to the RRU. The BBU may process the received signal sent by the RRU.

Optionally, the distributed base station further includes a coupling circuit corresponding to the RRU. The coupling circuit is also referred to as a calibration coupling disk. The coupling circuit is configured to perform self-calibration on the RRU corresponding to the coupling circuit. Specifically, the coupling circuit is configured to perform loopback on a calibration signal sent over a channel in the RRU corresponding to the coupling circuit, or configured to allocate power of a calibration signal to channels in the RRU corresponding to the coupling circuit for receiving. For example, as shown in FIG. 1, a coupling circuit 0 161 corresponding to the RRU0 141 is configured to perform loopback or power allocation on a calibration signal transmitted over the channel 0 to the channel A included in the RRU0 141. A coupling circuit 1 162 corresponding to the RRU1 142 is configured to perform loopback or power allocation on a calibration signal transmitted over the channel 0 to the channel B included in the RRU1 142.

Referring to FIG. 1, FIG. 1 shows a schematic structural diagram of a system for calibrating a channel between RRUs according to an embodiment of the present invention. The system for calibrating a channel between RRUs includes a BBU, a reference RRU, and a preset RRU.

In this embodiment, the following example is used for description: The RRU0 141 in FIG. 1 is a reference RRU, and the RRU1 142 is a preset RRU. The reference RRU and the preset RRU are RRUs in a same distributed base station, the reference RRU and the preset RRU are connected to a same BBU, and the BBU performs signal transmission with the reference RRU and the preset RRU, and provides an instruction for the reference RRU and the preset RRU.

In another implementation, a reference RRU and a preset RRU may be RRUs in different distributed base stations. The reference RRU and the preset RRU are separately connected to different BBUs. A BBU connected to the reference RRU provides an instruction for the reference RRU and performs signal transmission with the reference RRU. A BBU connected to the preset RRU provides an instruction for the preset RRU and performs signal transmission with the preset RRU. The BBU connected to the reference RRU may perform signal transmission with the BBU connected to the preset RRU.

The reference RRU and the preset RRU are RRUs configured to cooperatively transmit a same signal to a same terminal device. A transceiving response ratio of a channel in the preset RRU needs to be the same as a transceiving response ratio of a channel in the reference RRU.

A transceiving response ratio of a channel is a ratio of a transmitting response of the channel to a receiving response of the channel. The transmitting response of the channel is a channel response when an RRU in which the channel is located sends a signal by using the channel. The receiving response of the channel is a channel response when the RRU in which the channel is located receives a signal by using the channel.

Optionally, the reference RRU already performs self-calibration, and all channels included in the reference RRU have a same transceiving response ratio. Alternatively, the reference RRU does not perform self-calibration, and channels included in the reference RRU have different transceiving response ratios.

Optionally, the preset RRU already performs self-calibration, and all channels included in the preset RRU have a same transceiving response ratio. Alternatively, the preset RRU does not perform self-calibration, and channels included in the preset RRU have different transceiving response ratios.

The reference RRU includes one or more reference channels. A reference channel may be any channel in the reference RRU.

The preset RRU includes one or more preset channels. A transceiving response ratio of a preset channel in the preset RRU needs to be the same as a transceiving response ratio of the reference channel in the reference RRU. When the preset RRU already performs self-calibration, because all the channels in the preset RRU have the same transceiving response ratio, the preset channel is any channel in the preset RRU. When the preset RRU does not perform self-calibration, each channel included in the preset RRU is a preset channel.

The system for calibrating a channel between RRUs shown in FIG. 1 may be a Long Term Evolution (LTE) system, or other wireless communications systems using various radio access technologies, for example, a system using an access technology such as Code Division Multiple Access (CDMA), Time Division Multiple Access (TDMA), orthogonal frequency division multiple access (Orthogonal Frequency Division Multiplexing, OFDM), or single-carrier frequency-division multiple access (SC-FDMA). In addition, the system for calibrating a channel between RRUs may further be applicable to an evolved system subsequent to the LTE system, for example, a fifth generation mobile communication technology (5-Generation, 5G) system.

Figure 2:
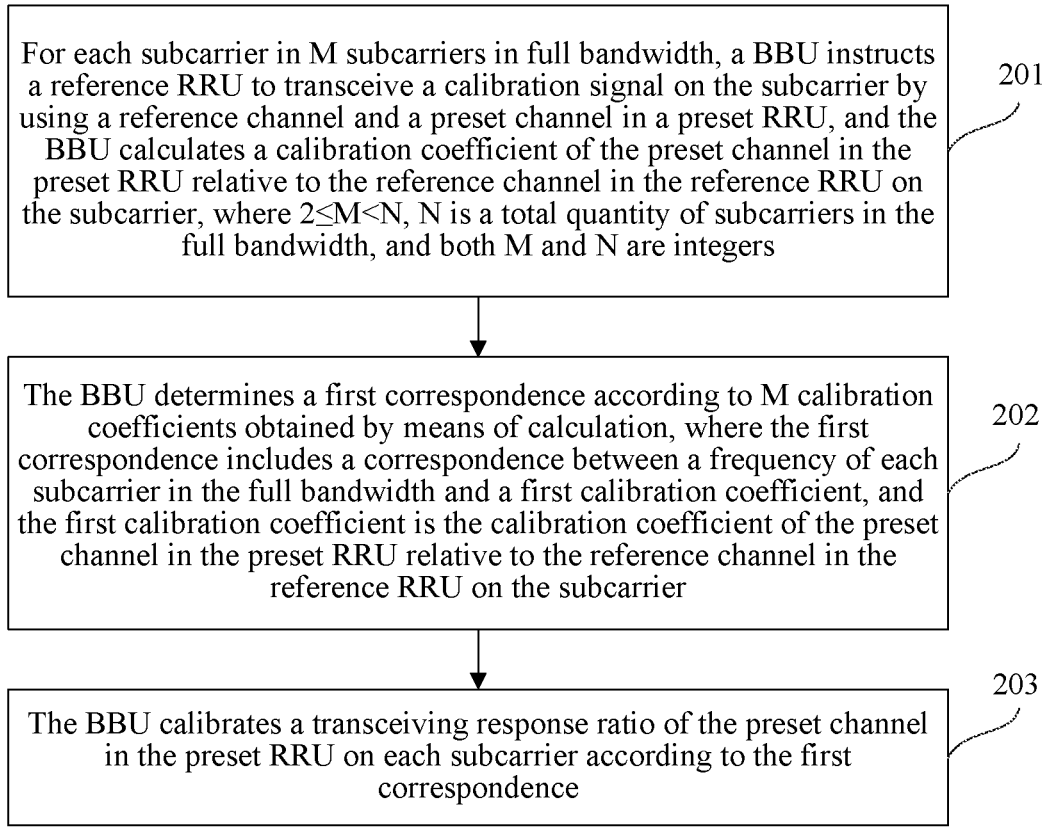
FIG. 2 is a flowchart of a method for calibrating a channel between RRUs according to an example of an embodiment of the present invention.

Referring to FIG. 2, FIG. 2 is a flowchart of a method for calibrating a channel between RRUs according to an example of an embodiment of the present invention. In this embodiment, that the method is applied to a system for calibrating a channel between RRUs shown in FIG. 1 is used for description, and the method includes:

Step 201: For each subcarrier in M subcarriers in full bandwidth, a BBU instructs a reference RRU to transceive a calibration signal on the subcarrier by using a reference channel and a preset channel in a preset RRU, and the BBU calculates a calibration coefficient of the preset channel in the preset RRU relative to the reference channel in the reference RRU on the subcarrier, where $2 \leq M < N$, N is a total quantity of subcarriers in the full bandwidth, and both M and N are integers.

Each channel in the reference RRU and the preset RRU operates in the full bandwidth. The full bandwidth includes multiple subcarriers. The full bandwidth is operating bandwidth of the system for calibrating a channel between RRUs related to the method for calibrating a channel between RRUs.

Step 202: The BBU determines a first correspondence according to M calibration coefficients obtained by means of calculation, where the first correspondence includes a correspondence between a frequency of each subcarrier in the full bandwidth and a first calibration coefficient, and the first calibration coefficient is the calibration coefficient of the preset channel in the preset RRU relative to the reference channel in the reference RRU on the subcarrier.

Step 203: The BBU calibrates a transceiving response ratio of the preset channel in the preset RRU on each subcarrier according to the first correspondence.

In conclusion, according to the method for calibrating a channel between RRUs provided in the embodiment of the present invention, a BBU only needs to instruct a reference RRU to transceive a calibration signal on some subcarriers in a full bandwidth by using a reference channel and a preset channel in a preset RRU, and obtain calibration coefficients by means of calculation, so that the BBU can determine a calibration coefficient of the preset channel in the preset RRU relative to the reference channel in the reference RRU in the full bandwidth, and calibrate a transceiving response ratio of the preset channel in the preset RRU in the full bandwidth. This resolves a problem of relatively high resource consumption caused because a calibration signal needs to be transceived on each subcarrier during calibration of a channel between RRUs, and reduces resource consumption. In addition, the calibration signal needs to be transmitted only on some subcarriers, thereby reducing power of the calibration signal.

Figure 3:
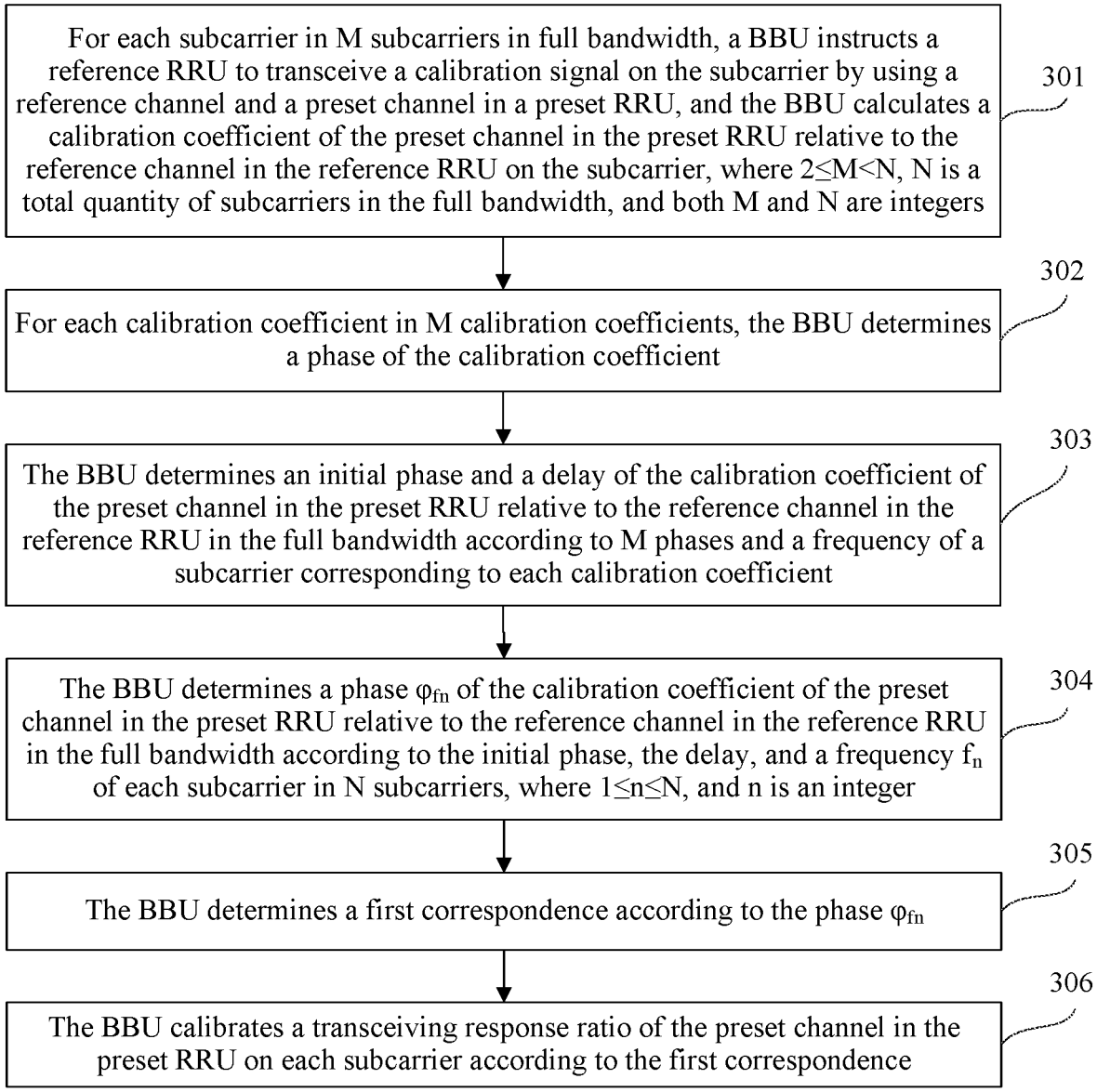
FIG. 3 is a flowchart of a method for calibrating a channel between RRUs according to an example of another embodiment of the present invention.

Referring to FIG. 3, FIG. 3 is a flowchart of a method for calibrating a channel between RRUs according to an example of an embodiment of the present invention. In this embodiment, that the method is applied to a system for calibrating a channel between RRUs shown in FIG. 1 is used for description, and the method includes:

Step 301: For each subcarrier in M subcarriers in full bandwidth, a BBU instructs a reference RRU to transceive a calibration signal on the subcarrier by using a reference channel and a preset channel in a preset RRU, and the BBU calculates a calibration coefficient of the preset channel in the preset RRU relative to the reference channel in the reference RRU on the subcarrier, where $2 \leq M < N$, N is a total quantity of subcarriers in the full bandwidth, and both M and N are integers.

The BBU instructs the reference RRU to transceive the calibration signal on a subcarrier by using the reference channel and the preset channel in the preset RRU, and calculates a calibration coefficient of the preset channel in the preset RRU relative to the reference channel in the reference RRU on the subcarrier. Specific processes thereof include the following several steps.

On a particular time domain resource, the reference RRU operates in a transmit mode, and the preset RRU operates in a receive mode.

1. The BBU instructs the reference RRU to send a calibration signal $S_1$ to the preset channel in the preset RRU by using the reference channel.

Optionally, the particular time domain resource is an uplink and downlink guard period (GP) interval of a special subframe of a $k^{th}$ radio frame in an LTE TDD system, and k is any integer greater than or equal to 1.

For any subcarrier of the M subcarrier, the BBU modulates the calibration signal $S_1$ onto the subcarrier and sends the calibration signal $S_1$ to the reference RRU by using the subcarrier. The reference RRU modulates the subcarrier onto a high frequency carrier and sends the high frequency carrier by using the reference channel.

2. The BBU instructs the preset RRU to receive, by using the preset channel, the calibration signal that is sent by the reference RRU by using the reference channel.

The BBU instructs the preset RRU to receive the high frequency carrier by using the preset channel, and to demodulate the high frequency carrier to obtain a calibration signal $Y_1 = T_1 * R_2 * H_{12} * S_1$ on the subcarrier. $T_1$ is a transmitting response of the reference channel in the reference RRU. $R_2$ is a receiving response of the preset channel in the preset RRU. $H_{12}$ is a response of an air interface between the reference channel in the reference RRU and the preset channel in the preset RRU.

On another particular time domain resource, the reference RRU operates in a receive mode, and the preset RRU operates in a transmit mode.

3. The BBU instructs the preset RRU to send a calibration signal $S_2$ to the reference channel in the reference RRU by using the preset channel.

Optionally, the another particular time domain resource is a GP interval of a special subframe of a $(k+1)^{th}$ radio frame in the LTE TDD system. In another possible implementation, the another particular time domain resource may be another radio frame. This is not limited in this embodiment.

4. The BBU instructs the reference RRU to receive, by using the reference channel, the calibration signal that is sent by the preset RRU by using the preset channel.

The BBU instructs the reference RRU to receive a high frequency signal by using the reference channel, and to demodulate the high frequency signal to obtain a calibration signal $Y_2 = T_2 * R_1 * H_{12} * S_2$ on the subcarrier. $T_2$ is a transmitting response of the preset channel in the preset RRU. $R_1$ is a receiving response of the reference channel in the reference RRU.

5. The BBU calculates a calibration coefficient α of the preset channel in the preset RRU relative to the reference channel in the reference RRU on the subcarrier according to the calibration signal $S_1$ sent by the reference RRU by using the reference channel, the calibration signal $Y_1$ received by the preset RRU by using the preset channel, the calibration signal $S_2$ sent by the preset RRU by using the preset channel, and the calibration signal $Y_2$ received by the reference RRU by using the reference channel. The calibration coefficient α is corresponding to the subcarrier:

$$\alpha = \frac{T_1/R_1}{T_2/R_2} = \frac{Y_1/S_1}{Y_2/S_2}$$

It should be noted that, when the reference RRU and the preset RRU are not connected to a same BBU, a BBU connected to the reference RRU determines $S_1$ and $Y_2$ by performing the method shown in the foregoing step 1 and step 4, and a BBU connected to the preset RRU determines $Y_1$ and $S_2$ by performing the method shown in the foregoing step 2 and step 3. The BBU connected to the preset RRU determines $S_1$ and $Y_2$ by performing signal transmission with the BBU connected to the reference RRU, and calculates the calibration coefficient α of the preset channel in the preset RRU relative to the reference channel in the reference RRU on the subcarrier by using the method shown in the foregoing step 5.

The BBU uses the foregoing method to calculate, on a same time domain resource or different time domain resources, a calibration coefficient of the preset channel in the preset RRU relative to the reference channel in the reference RRU on any subcarrier of the M subcarriers in the full bandwidth.

A frequency of each subcarrier in the M subcarriers is different. It is assumed that frequencies of the M subcarriers are respectively $f_1, f_2, \ldots, f_M$. A difference between frequencies of any two subcarriers is less than a preset frequency threshold.

Optionally, the preset frequency threshold is a threshold corresponding to a maximum value $\tau_{max}$ of a difference between delays of any two RRUs during signal receiving and transmitting. The maximum value $\tau_{max}$ of the difference between the delays of the any two RRUs is a value preset in the system. Optionally, if the preset frequency threshold is $$\frac{1}{\tau_{max}}, f_i - f_j < \frac{1}{\tau_{max}}.$$

$f_i$ and $f_j$ are frequencies of any two subcarriers in the M subcarriers, $1 \le i \le M$, $1 \le j \le M$, and $i \ne j$. The preset frequency threshold may be $$\frac{2}{\tau_{max}}$$

or another threshold that has a correspondence with $\tau_{max}$. This is not limited in this embodiment.

For example, the maximum value $\tau_{max}$ of the difference between the delays of the any two RRUs during signal receiving and transmitting is 400 ns. When the BBU instructs to transceive the calibration signal by using the reference channel in the reference RRU and the preset channel in the preset RRU on the M subcarriers, a difference $f_i - f_j$ between the frequencies of the any two subcarriers in the M subcarriers<2.5 MHZ.

In another possible implementation, after instructing the reference RRU to transceive the calibration signal on the M subcarriers by using the reference channel and the preset channel in the preset RRU, the BBU may calculate only calibration coefficients of the preset channel in the preset RRU relative to the reference channel in the reference RRU on several subcarriers in the M subcarriers, and calculate calibration coefficients on at least two subcarriers. A quantity of calibration coefficients calculated by the BBU is not limited in this embodiment. In this embodiment, an example in which the BBU calculates M calibration coefficients of the preset channel in the preset RRU relative to the reference channel in the reference RRU on the M subcarriers is used for description.

Step 302: For each calibration coefficient in M calibration coefficients, the BBU determines a phase of the calibration coefficient.

A predetermined function relationship exists between a calibration coefficient and a phase of the calibration coefficient. The BBU determines the phase $\varphi$ of the calibration coefficient according to the calibration coefficient and the predetermined function relationship. The predetermined function relationship may be a sine function relationship, a cosine function relationship, or the like. During actual implementation, the predetermined function relationship is usually expressed in a complex envelope form. This is not limited in this embodiment.

For example, when the predetermined function relationship between the calibration coefficient and the phase of the calibration coefficient is a sine function relationship, if a calibration coefficient is $\alpha=c*\exp(j*\theta)$, it is determined that a phase of the calibration coefficient is $\theta$, and $c \neq 0$.

Step 303: The BBU determines an initial phase and a delay of a calibration coefficient of the preset channel in the preset RRU relative to the reference channel in the reference RRU in the full bandwidth according to M phases and a frequency of the subcarrier corresponding to each calibration coefficient.

Optionally, a predetermined function relationship exists between a phase $\varphi$ of each calibration coefficient, and a frequency $f$ of a subcarrier corresponding to the calibration coefficient, an initial phase $\varphi_0$ in the full bandwidth, and a delay $\tau$ of the calibration coefficient in the full bandwidth. Optionally, $\varphi=2\pi f^*\tau+\varphi_0$. $\varphi$ is the phase of the calibration coefficient, $f$ is the frequency of the subcarrier corresponding to the calibration coefficient, $\tau$ is the delay of the calibration coefficient in the full bandwidth, and $\varphi_0$ is the initial phase of the calibration coefficient in the full bandwidth.

Optionally, when M=2, the BBU determines the initial phase in the full bandwidth and the delay in the full bandwidth according to two phases and a frequency of a subcarrier corresponding to each calibration coefficient. When M>2, the BBU determines a group of initial phase and delay according to phases of any two or more calibration coefficients in the M phases, determines the initial phase in the full bandwidth according to several initial phases, and determines the delay in the full bandwidth according to several delays; or the BBU directly determines the initial phase and the delay in the full bandwidth according to the M phases. Optionally, the delay in the full bandwidth is an average value of several delays obtained by means of calculation, or the delay in the full bandwidth is a delay in several delays obtained by means of calculation that has a minimum variance with an average value of the several delays. The initial phase in the full bandwidth is an average value of several groups of initial phases obtained by means of calculation, or the initial phase in the full bandwidth is an initial phase in several initial phases obtained by means of calculation that has a minimum variance with an average value of the several initial phases. A method for determining the delay in the full bandwidth and the initial phase in the full bandwidth according to several delays and initial phases is not limited in this embodiment.

For example, when M=2, assuming that a phase of a first calibration coefficient is $\varphi_{f1}$ and a frequency of a subcarrier corresponding to the first calibration coefficient is $f_1$, $\varphi_{f1}=2\pi f_1\tau+\varphi_0$. If a phase of a second calibration coefficient is $\varphi_{f2}$ and a frequency of a subcarrier corresponding to the second calibration coefficient is $f_2$, $\varphi_{f2}=2\pi f_2\tau+\varphi_0$. Then, it may be determined, according to the two function relationships, that the delay $\tau$ of the calibration coefficient of the preset channel in the preset RRU relative to the reference channel in the reference RRU in the full bandwidth is as follows:

$$\tau = \frac{\varphi_{f2} - \varphi_{f1}}{2\pi(f_2 - f_1)};$$

and
that the initial phase $\varphi_0$ of the calibration coefficient of the preset channel in the preset RRU relative to the reference channel in the reference RRU in the full bandwidth is as follows:

$$\varphi_0 = \frac{\varphi_{f1}*f_2 - \varphi_{f2}*f_1}{f_2 - f_1}$$

For another example, when M=4, the BBU determines a group of delays $\tau_1$ and initial phases $\varphi_{01}$ by using the foregoing method according to a phase of a first calibration coefficient, a frequency of a corresponding subcarrier, a phase of a second calibration coefficient, and a frequency of a corresponding subcarrier. The BBU determines a group of delays $\tau_2$ and initial phases $\varphi_{02}$ by using the foregoing method according to a phase of a third calibration coefficient, a frequency of a corresponding subcarrier, a phase of a fourth calibration coefficient, and a frequency of a corresponding subcarrier. Then the BBU determines that the delay of the calibration coefficient of the preset channel in the preset RRU relative to the reference channel in the reference RRU in the full bandwidth is $\tau=(\tau_1+\tau_2)/2$, and the initial phase is $\varphi_0=(\varphi_{01}+\varphi_{02})/2$.

In another possible implementation, the BBU may determine phases of only several calibration coefficients of the M calibration coefficients, and determine the initial phase and the delay of the calibration coefficient of the preset channel in the preset RRU relative to the reference channel in the reference RRU in the full bandwidth according to the phases of the several calibration coefficients and a frequency of a subcarrier corresponding to each calibration coefficient. In addition, the BBU determines phases of at least two calibration coefficients of the M calibration coefficients. A quantity of phases, determined by the BBU, of calibration coefficients is not limited in this embodiment.

Step 304: According to the initial phase, the delay, and frequencies $f_n$ of the N subcarriers, the BBU determines phases $\varphi_{fn}$ of the calibration coefficients of the preset channel in the preset RRU relative to the reference channel in the reference RRU in the full bandwidth, where $1 \leq n \leq N$, and n is an integer.

Optionally, $\varphi_{fn}=2\pi f_n^*\tau+\varphi_0$. $\tau$ is the delay, determined by using the foregoing method, in the full bandwidth. $\varphi_0$ is the initial phase, determined by using the foregoing method, in the full bandwidth. In the foregoing example, when M=2, $$\tau = \frac{\varphi_{f2} - \varphi_{f1}}{2\pi(f_2 - f_1)}, \text{ and } \varphi_0 = \frac{\varphi_{f1}*f_2 - \varphi_{f2}*f_1}{f_2 - f_1}.$$

Step 305: The BBU determines a first correspondence according to the phases $\varphi_{fn}$.

The first correspondence includes a correspondence between the frequency of each subcarrier in the full bandwidth and a first calibration coefficient. The first calibration coefficient is the calibration coefficient of the preset channel in the preset RRU relative to the reference channel in the reference RRU on the subcarrier.

A predetermined function relationship exists between a phase of each subcarrier and a calibration coefficient on each subcarrier. The predetermined function relationship may be the same as the predetermined function relationship in the foregoing step 302. For example, in the foregoing example, if the predetermined function relationship between the calibration coefficient and the phase of the calibration coefficient is a sine function relationship, after the phase $\varphi_{fn}$ of each subcarrier is determined, it is determined that the calibration coefficient on each subcarrier is $\alpha_{fn}=c*\exp(j*\varphi_{fn})$, where $\varphi_{fn}=2\pi f_n * \tau + \varphi_0$, and then the first correspondence is $\alpha_{fn}=c*\exp(j*(2\pi f_n * \tau + \varphi_0))$. When a value of n is different, $f_n$ indicates a frequency of a different subcarrier, and $\alpha_{fn}$ indicates a calibration coefficient on the different subcarrier.

Step 306: The BBU calibrates a transceiving response ratio of the preset channel in the preset RRU on each subcarrier according to the first correspondence.

For each subcarrier included in the full bandwidth, when calibrating the preset channel in the preset RRU on the subcarrier, the BBU determines the calibration coefficient α of the preset channel in the preset RRU relative to the reference channel in the reference RRU on the subcarrier. The BBU obtains, by means of calculation, the calibration coefficient of the preset channel in the preset RRU relative to the reference channel in the reference RRU on each subcarrier in the M subcarriers according to the method shown in the foregoing step 301, and determines, according to the first correspondence, a calibration coefficient of the preset channel in the preset RRU relative to the reference channel in the reference RRU on another subcarrier in the N subcarriers that is different from the foregoing M subcarriers.

The calibration coefficient on each subcarrier is $$\alpha = \frac{T_1/R_1}{T_2/R_2} = \frac{Y_1/S_1}{Y_2/S_2},$$

that is, $$\frac{T_1}{R_1} = \alpha \frac{T_2}{R_2} \cdot \frac{T_1}{R_1}$$

is a transceiving response ratio of the reference channel in the reference RRU on the subcarrier.

$$\frac{T_2}{R_2}$$

is the transceiving response ratio of the preset channel in the preset RRU on the subcarrier. When the BBU instructs the preset RRU to use the preset channel to send a signal on the subcarrier, multiplying a magnitude of the sent signal by the calibration coefficient α is equivalent to multiplying a transmitting response of the preset channel in the preset RRU on the subcarrier by the calibration coefficient α; or when the BBU instructs the preset RRU to use the preset channel to receive a signal on the subcarrier, dividing the received signal by the calibration coefficient α is equivalent to dividing a receiving response of the preset channel in the preset RRU on the subcarrier by the calibration coefficient α. Therefore, the transceiving response ratio of the preset channel in the preset RRU on the subcarrier is calibrated.

When the preset RRU already performs self-calibration, because all channels included in the preset RRU have a same transceiving response ratio, a transceiving response ratio of each channel in the preset RRU on each subcarrier is calibrated according to the calibration coefficient, obtained by means of calculation, on each subcarrier by using the foregoing method.

It should be noted that, in the foregoing method, if the reference RRU does not perform self-calibration, after the first correspondence of the preset channel in the preset RRU relative to the reference channel in the reference RRU is determined, and before the transceiving response ratio of the preset channel in the preset RRU on each subcarrier is calibrated according to the first correspondence, the reference RRU needs to perform self-calibration, determine a primary reference channel in the reference RRU, determine a correspondence of the preset channel in the preset RRU relative to the primary reference channel in the reference RRU, and calibrate the transceiving response ratio of the preset channel in the preset RRU on each subcarrier according to the correspondence, so that all the channels in the preset RRU have the same transceiving response ratio as all channels in the reference RRU.

It should be noted that the method for calibrating a channel between RRUs shown in FIG. 3 may also be applied to an RRU including a processing module. The RRU including the processing module has processing capabilities such as performing an operation such as sending a calibration signal or receiving a calibration signal over a particular channel, calculating a calibration coefficient, and calibrating a transceiving response ratio of a channel. Then the preset RRU can calibrate a transceiving response ratio of a channel by performing step 301 to step 306 in the foregoing.

In conclusion, according to the method for calibrating a channel between RRUs provided in the embodiment of the present invention, a BBU only needs to instruct a reference RRU to transceive a calibration signal on some subcarriers in a full bandwidth by using a reference channel and a preset channel in a preset RRU, and obtain calibration coefficients, so that the BBU can determine a calibration coefficient of the preset channel in the preset RRU relative to the reference channel in the reference RRU in the full bandwidth, and calibrate a transceiving response ratio of the preset channel in the preset RRU in the full bandwidth. This resolves a problem of relatively high resource consumption caused because a calibration signal needs to be transceived on each subcarrier during calibration a channel between RRUs, and reduces resource consumption. In addition, the calibration signal needs to be transmitted only on some subcarriers, thereby reducing power of the calibration signal.

According to the method for calibrating a channel between RRUs provided in the embodiment of the present invention, the calibration signal is transceived in a GP interval of a radio frame. This resolves a problem that when a calibration signal is transceived on all subcarriers in the full bandwidth, a relatively large quantity of GP resources are occupied and consequently interference to an uplink service increases, reduces occupation of the GP resources of the radio frame, and mitigates impact on the uplink service.

According to the method for calibrating a channel between RRUs provided in the embodiment of the present invention, the BBU needs to calculate calibration coefficients corresponding to only some subcarriers. This reduces a processing operation amount of the BBU.

In an example, a channel 0 in a reference RRU shown in FIG. 1, that is, in an RRU0 is a reference channel, and a channel 0 in a preset RRU, that is, in an RRU1 is a preset channel. Assuming that full bandwidth includes a total of 1000 subcarriers, the BBU instructs the reference RRU to transceive a calibration signal on a subcarrier with a frequency 15 kHZ and a subcarrier with a frequency 45 kHZ by using the channel 0 and the channel 0 in the preset RRU, and calculates a calibration coefficient $\alpha_1 = 10^*\exp(j^*(9\pi + 7.8^*10^5))$ of the channel 0 in the preset RRU relative to the channel 0 in the reference RRU on the subcarrier with the frequency 15 kHZ and a calibration coefficient $\alpha_2 = 10^*\exp(j^*(18\pi + 7.8^*10^5))$ of the channel 0 in the preset RRU relative to the channel 0 in the reference RRU on the subcarrier with the frequency 45 kHZ.

Then the BBU determines that a delay of a calibration coefficient of the channel 0 in the preset RRU relative to the channel 0 in the reference RRU in the full bandwidth is $$\tau = \frac{\varphi_{f2} - \varphi_{f1}}{2\pi(f_2 - f_1)} = \frac{(18\pi + 7.8*10^5) - (9\pi + 7.8*10^5)}{2\pi(45*10^3 - 15*10^3)} = 150\text{ns},$$

and an initial phase is $$\varphi_0 = \frac{\varphi_{f1}*f_2 - \varphi_{f2}*f_1}{f_2 - f_1} = 5\pi + 7.8*10^5.$$

The BBU determines that a first correspondence is $\alpha_{fn} = 10^*\exp(j^*(2\pi f_n^*150^*10^{-6} + 5\pi + 7.8^*10^5))$.

A transceiving response ratio of the channel 0 in the preset RRU on the subcarrier with the frequency 15 kHZ is calibrated according to the calibration coefficient $\alpha_1$, obtained by means of calculation, on the subcarrier with the frequency 15 kHZ. Likewise, a transceiving response ratio of the channel 0 in the preset RRU on the subcarrier with the frequency 45 kHZ is calibrated according to the calibration coefficient $\alpha_2$, obtained by means of calculation, on the subcarrier with the frequency 45 kHZ. A calibration coefficient on another subcarrier in the 1000 subcarriers that is different from the subcarriers corresponding to the frequency 15 kHZ and the frequency 45 kHZ is determined according to the first correspondence. For example, a calibration coefficient on a subcarrier with a frequency 60 kHZ in the 1000 subcarriers is determined to be $\alpha_{60\,kHZ} = 10^*\exp(j^*(2\pi 60^*10^3 ^*150^*10^{-6} + 5\pi + 7.8^*10^5)) = 10^*\exp(j^*(23\pi + 7.8^*10^5))$, and a transceiving response ratio of the channel 0 in the preset RRU on the subcarrier with the frequency 60 kHZ is calibrated according to the calibration coefficient $\alpha_{60\,kHZ}$. Likewise, a transceiving response ratio of the channel 0 in the preset RRU on the another subcarrier in the 1000 subcarriers is calibrated by using the foregoing method.

Figure 4:
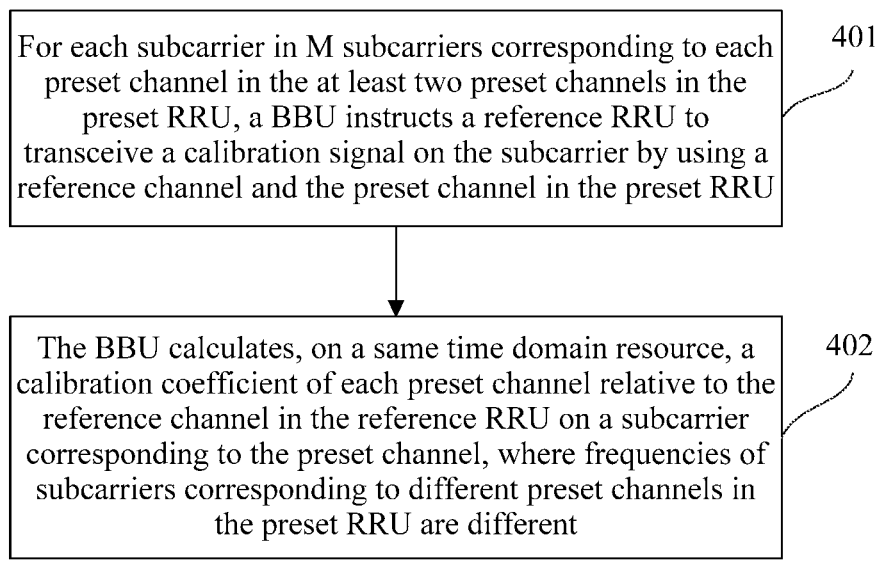
FIG. 4 is a flowchart of a method for calibrating a channel between RRUs according to an example of another embodiment of the present invention.

Optionally, in another optional embodiment based on the foregoing embodiments, a preset RRU includes at least two preset channels. Step 301 in the foregoing embodiment may be replaced with the following steps for implementation, as shown in FIG. 4.

Step 401: For each subcarrier in M subcarriers corresponding to each preset channel in the at least two preset channels in the preset RRU, a BBU instructs a reference RRU to transceive a calibration signal on the subcarrier by using a reference channel and the preset channel in the preset RRU.

Frequencies of M subcarriers corresponding to different preset channels in the preset RRU are different. Quantities of M subcarriers corresponding to different preset channels in the preset RRU are the same or different. That is, values of M may be the same or different.

Optionally, the BBU instructs the reference RRU to transceive, on a same time domain resource, the calibration signal on subcarriers corresponding to the at least two preset channels in the preset RRU by using the reference channel and the at least two preset channels in the preset RRU.

For example, two preset channels included in the preset RRU are respectively a channel 0 and a channel 1. The channel 0 in the preset RRU is corresponding to three subcarriers whose frequencies are respectively 15 kHZ, 30 kHZ, and 45 kHZ. The channel 1 in the preset RRU is corresponding to four subcarriers whose frequencies are respectively 60 kHZ, 75 kHZ, 90 kHZ, and 105 kHZ. The BBU instructs the reference RRU to transceive, in a GP interval of a special subframe of a first radio frame in an LTE TDD system, the calibration signal on the subcarriers with the frequencies 15 kHZ, 30 kHZ, and 45 kHZ by using the reference channel and the channel 0 in the preset RRU, and instructs to transceive, in the GP interval of the special subframe of the first radio frame in the LTE TDD system, the calibration signal on the subcarrier with the frequencies 60 kHZ, 75 kHZ, 90 kHZ, and 105 kHZ by using the reference channel in the reference RRU and the channel 1 in the preset RRU.

Step 402: The BBU calculates, on a same time domain resource, a calibration coefficient of each preset channel relative to the reference channel in the reference RRU on a subcarrier corresponding to the preset channel, where frequencies of subcarriers corresponding to different preset channels in the preset RRU are different.

For each preset channel in the at least two preset channels in the preset RRU, after M calibration coefficients of the preset channel relative to the reference channel in the reference RRU on the M subcarriers corresponding to the preset channel are obtained by means of calculation, a transceiving response ratio of the preset channel in the preset RRU on each subcarrier in full bandwidth is calibrated by using the method shown in step 302 to step 306 in the foregoing embodiment.

Optionally, the BBU calibrates, on the same time domain resource, transceiving response ratios of the at least two preset channels in the preset RRU on each subcarrier in the full bandwidth.

It should be noted that, during actual implementation, in the foregoing step 401, when the BBU instructs the reference RRU to transceive the calibration signal on the subcarrier by using the reference channel and the preset channel in the preset RRU, and when the preset RRU has different preset channels, reference channels in the reference RRU may also be different channels. If the reference RRU does not perform self-calibration, that is, transceiving response ratios of different reference channels are different, after a first correspondence of a preset channel relative to a reference channel corresponding to the preset channel is determined, the reference RRU performs self-calibration, so that all channels in the preset RRU have the same transceiving response ratio as all channels in the reference RRU. For a specific implementation method, refer to the method shown in the embodiment shown in FIG. 3, and details are not repeated in this embodiment.

In conclusion, according to the method for calibrating a channel between RRUs provided in the embodiment of the present invention, multiple preset channels in a preset RRU use M different subcarriers, so that a BBU can instruct to transceive a calibration signal concurrently on different subcarriers by using a reference channel in a reference RRU and the multiple preset channels in the preset RRU at the same time, so as to concurrently determine and obtain multiple first correspondences, and can calibrate transceiving response ratios of the multiple channels in the preset RRU according to the determined first correspondences. This resolves a problem of a relatively long calibration period caused because calibration signals need to be successively transceived for calibration when transceiving response ratios of a relatively large quantity of preset channels in the preset RRU need to be calibrated, and reduces a calibration period.

Figure 5:
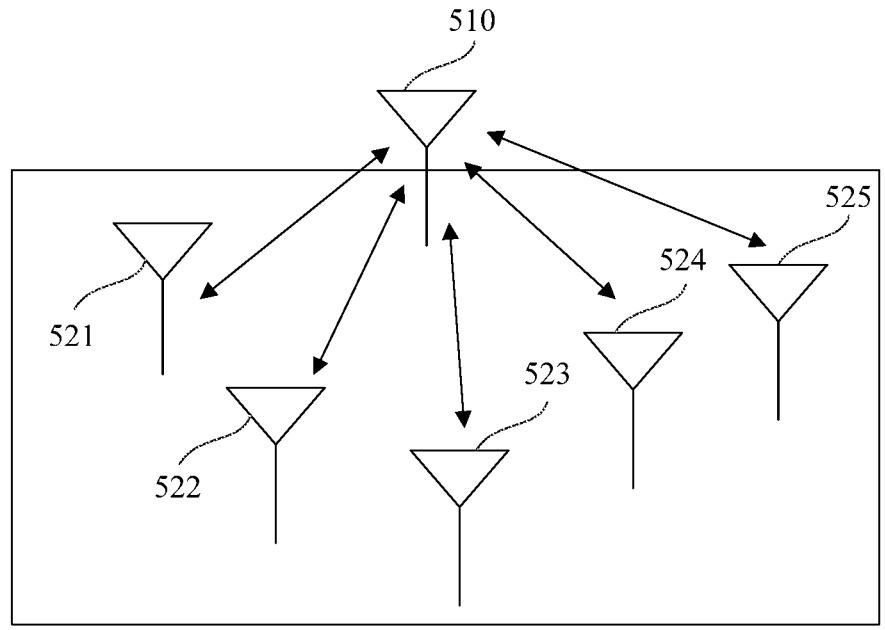
FIG. 5 is a schematic structural diagram of a system for calibrating a channel between RRUs according to an example of another embodiment of the present invention.

Optionally, in another optional embodiment based on the foregoing embodiments, a system for calibrating a channel between RRUs shown in FIG. 1 may include K RRUs. A signal quality value between at least one RRU and other RRUs in the K RRUs is greater than a preset threshold. The K RRUs form a star structure, and the K RRUs include one reference RRU and at least two preset RRUs. K≥3, and K is an integer. As shown in FIG. 5, FIG. 5 shows an example of a schematic diagram in which a system for calibrating a channel between RRUs includes six RRUs and the six RRUs form a star structure.

Optionally, the signal quality value is a signal strength or a signal-to-noise ratio. A signal strength between two RRUs is a signal strength of a signal transmitted when one RRU transmits information with any channel in the other RRU by using any channel.

Figure 6:
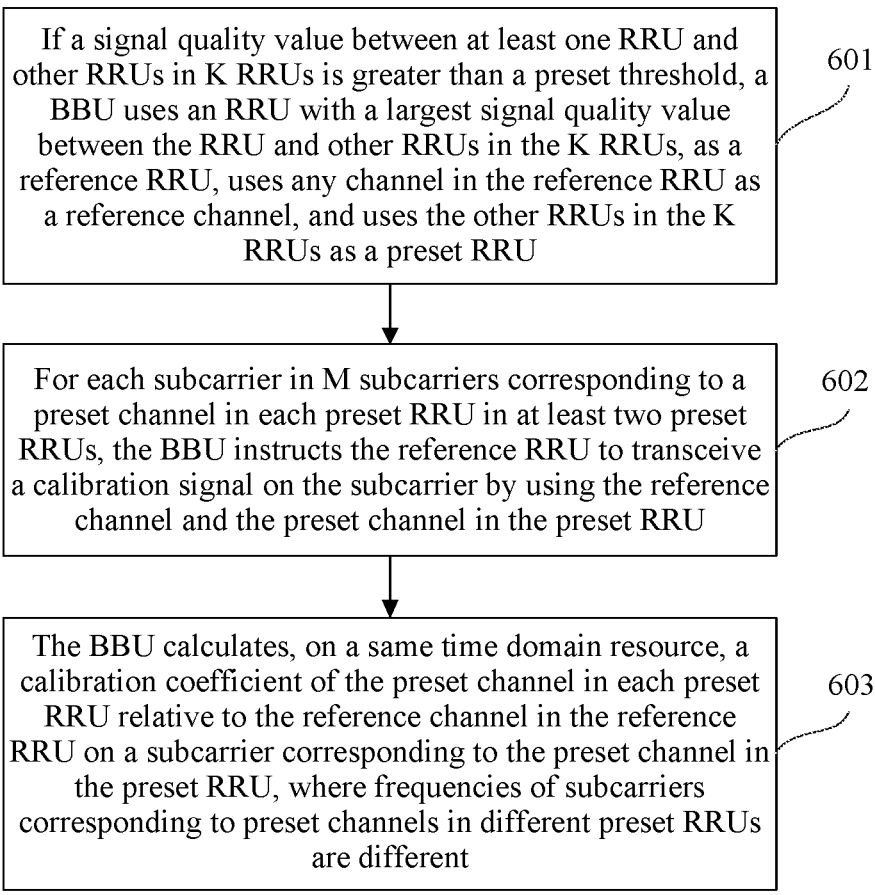
FIG. 6 is a flowchart of a method for calibrating a channel between RRUs according to an example of another embodiment of the present invention.

When the method for calibrating a channel between RRUs is applied to the system for calibrating a channel between RRUs shown in FIG. 5, the method further includes the following steps, as shown in FIG. 6.

Step 601: If a signal quality value between at least one RRU and other RRUs in K RRUs is greater than a preset threshold, a BBU uses an RRU with a largest signal quality value between the RRU and other RRUs in the K RRUs, as a reference RRU, uses any channel in the reference RRU as a reference channel, and uses the other RRUs in the K RRUs as a preset RRU.

The K RRUs are RRUs configured to cooperatively transmit a same signal to a same terminal device. It should be noted that the K RRUs form a star structure in this embodiment, provided that a signal quality value between at least one RRU and other RRUs in the K RRUs is greater than the preset threshold. A magnitude of a signal quality value between other RRUs is not limited in this embodiment.

Optionally, if a signal quality value between only one RRU and other RRUs in the K RRUs is greater than the preset threshold, the RRU with a signal quality value between the RRU and the other RRUs greater than the preset threshold is determined as the reference RRU, and the other RRUs in the K RRUs is the preset RRU.

Optionally, if signal quality values between multiple RRUs and other RRUs in the K RRUs are greater than the preset threshold, an RRU with a largest signal quality value between the RRU and other RRUs is determined as the reference RRU, or any one of the multiple RRUs is selected as the reference RRU, and other RRUs in the K RRUs is the preset RRU. The largest signal quality value between the RRU and the other RRUs may be a largest average value of signal quality values between the RRU and the other RRUs. For example, the signal quality value is a signal strength, and an RRU with a largest signal strength between the RRU and other RRUs is selected as the reference RRU. Assuming that the preset threshold is −80 dbm, and signal strengths between a first RRU and other two RRUs in three RRUs are −60 dbm and −64 dbm, an average value is −62 dbm. Assuming that signal strengths between a second RRU and other two RRUs are −66 dbm and −70 dbm, an average value is −68 dbm. Then the first RRU is determined as the reference RRU.

The preset threshold is a value preset in the system or is defined by a user. This is not limited in this embodiment.

It should be noted that different preset RRUs may also be corresponding to different reference channels in the reference RRU. For example, it is determined that a channel 0 in a reference RRU is a reference channel corresponding to a preset RRU1, and it is determined that a channel 1 in the reference RRU is a reference channel corresponding to a preset RRU2. Then the BBU instructs the reference RRU to transceive a calibration signal by using the channel 0 and a preset channel in the preset RRU1, and instructs the reference RRU to transceive the calibration signal by using the channel 1 and a preset channel in the preset RRU2.

It should be noted that, when two RRUs cannot perform information transmission, a signal quality value between the two RRUs may be considered to be an extremely small value. For example, when the signal quality value is a signal strength, a signal strength between the two RRUs is considered to be −90 dbm or even to be a smaller signal strength.

In the system for calibrating a channel between RRUs shown in FIG. 5, only an RRU 510 can perform information transmission with other RRUs. Therefore, the RRU 510 is the reference RRU, and an RRU 521, an RRU 522, an RRU 523, an RRU 524, and RRU 525 are preset RRUs.

The foregoing step 301 may be replaced with the following step for implementation:

Step 602: For each subcarrier in M subcarriers corresponding to a preset channel in each preset RRU in at least two preset RRUs, the BBU instructs the reference RRU to transceive a calibration signal on the subcarrier by using the reference channel and the preset channel in the preset RRU.

Frequencies of M subcarriers corresponding to preset channels in different preset RRUs are different. Quantities of the M subcarriers corresponding to the preset channels in the different preset RRUs are the same or different. That is, values of M may be the same or different.

Optionally, the BBU instructs the reference RRU to transceive, on a same time domain resource, the calibration signal on subcarriers corresponding to preset channels in the at least two preset RRUs by using the reference channel and the preset channels in the at least two preset RRUs.

Optionally, any preset RRU in the at least two preset RRUs includes one or more preset channels. When one preset RRU includes multiple preset channels, frequencies of subcarriers corresponding to different preset channels in different preset RRUs are different, and quantities of corresponding subcarriers are the same or different. Then the BBU instructs the reference RRU to transceive, on the same time domain resource and on subcarriers corresponding to multiple preset channels in multiple preset RRUs, the calibration signal by using the reference channel and the multiple preset channels in the multiple preset RRUs.

For example, the preset RRU 521, the preset RRU 522, the preset RRU 523, the preset RRU 524, and the preset RRU 525 in the system for calibrating a channel between RRUs shown in FIG. 5 each include only one preset channel, and a channel 0 in each preset RRU is a preset channel.

A channel 0 in the preset RRU 521 is corresponding to two subcarriers whose frequencies are respectively 15 kHZ and 30 kHZ. A channel 0 in the preset RRU 522 is corresponding to three subcarriers whose frequencies are respectively 45 kHZ, 60 kHZ, and 75 kHZ. A channel 0 in the preset RRU 523 is corresponding to two subcarriers whose frequencies are respectively 90 kHZ and 105 kHZ. A channel 0 in the preset RRU 524 is corresponding to two subcarriers whose frequencies are respectively 130 kHZ and 145 kHZ. A channel 0 in the preset RRU 525 is corresponding to three subcarriers whose frequencies are respectively 160 kHZ, 175 kHZ, and 190 kHZ. Then the BBU may instruct, in a GP interval of a special subframe of a first radio frame in an LTE TDD system, the reference RRU 510 to transceive the calibration signal on the subcarriers with the frequencies 15 kHZ and 30 kHZ by using the reference channel and the channel 0 in the preset RRU 521, to transceive the calibration signal on the subcarriers with the frequencies 45 kHZ, 60 kHZ, and 75 kHZ by using the reference channel and the channel 0 in the preset RRU 522, to transceive the calibration signal on the subcarriers with the frequencies 90 kHZ and 105 kHZ by using the reference channel and the channel 0 in the preset RRU 523, to transceive the calibration signal on the subcarriers with the frequencies 130 kHZ and 145 kHZ by using the reference channel and the channel 0 in the preset RRU 524, and to transceive the calibration signal on the subcarriers with the frequencies 160 kHZ, 175 kHZ, and 190 kHZ by using the reference channel and the channel 0 in the preset RRU 525.

Step 603: The BBU calculates, on a same time domain resource, a calibration coefficient of the preset channel in each preset RRU relative to the reference channel in the reference RRU on a subcarrier corresponding to the preset channel in the preset RRU, where frequencies of subcarriers corresponding to preset channels in different preset RRUs are different.

For a preset channel in each preset RRU in the at least two preset RRUs, after M calibration coefficients of the preset channel in the preset RRU relative to the reference channel in the reference RRU on M subcarriers corresponding to the preset RRU are obtained by means of calculation, a transceiving response ratio of the preset channel in the preset RRU on each subcarrier in full bandwidth is calibrated by using the method shown in step 302 to step 306 in the foregoing embodiment.

Optionally, the BBU calibrates, on the same time domain resource, transceiving response ratios of the preset channels in the at least two preset RRUs on each subcarrier in the full bandwidth.

It should be noted that, during actual implementation, in the foregoing step 602, when the BBU instructs the reference RRU to transceive the calibration signal on the subcarrier by using the reference channel and the preset channel in the preset RRU, a reference channel in the reference RRU may be different for preset channels in different preset RRUs. When one preset RRU includes multiple preset channels, a reference channel in the reference RRU may also be different for different preset channels in the preset RRU. If the reference RRU does not perform self-calibration, that is, transceiving response ratios of different reference channels are different, after a first correspondence of a preset channel relative to a reference channel corresponding to the preset channel is determined, the reference RRU performs self-calibration, so that all channels in the preset RRU have the same transceiving response ratio as all channels in the reference RRU. For a specific implementation method, refer to the method shown in the embodiment shown in FIG. 3, and details are not repeated in this embodiment.

In conclusion, according to the method for calibrating a channel between RRUs provided in the embodiment of the present invention, preset channels in multiple preset RRUs use M different subcarriers, so that a BBU can instruct to transceive a calibration signal concurrently on different subcarriers by using a reference channel in a reference RRU and the preset channels in the multiple preset RRUs at the same time, so as to concurrently determine and obtain multiple first correspondences, and can calibrate transceiving response ratios of multiple channels in the preset RRUs according to the determined first correspondences. This resolves a problem of a relatively long calibration period caused when transceiving response ratios of channels of a relatively large quantity of preset RRUs need to be successively calibrated, implements that multiple pairs of RRUs can transceive a calibration signal at the same time and do not interfere with each other, and reduces a calibration period.

Figure 7:
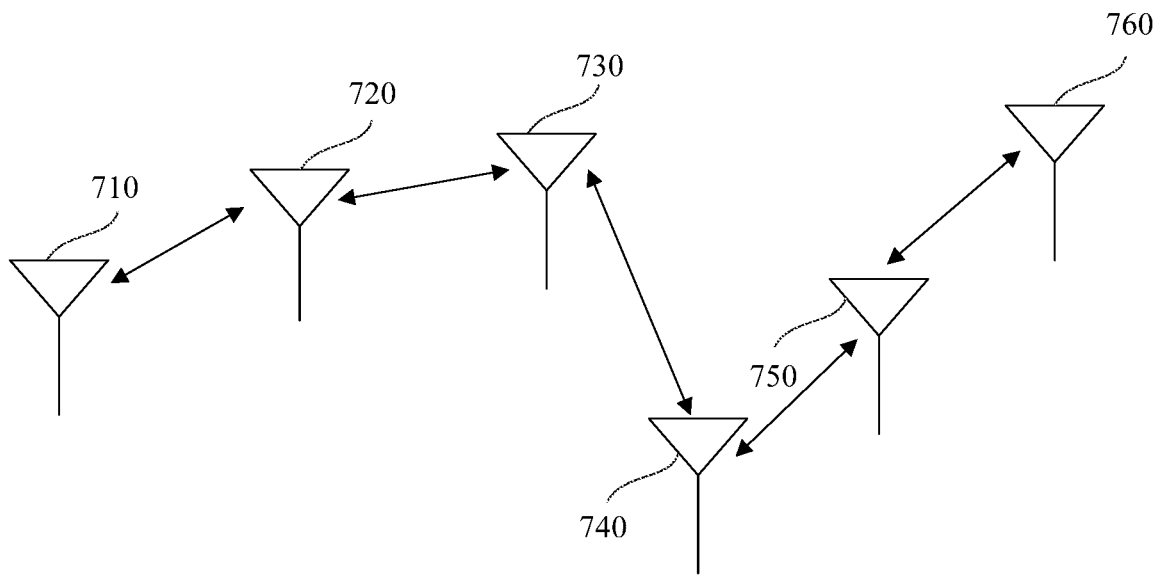
FIG. 7 is a schematic structural diagram of a system for calibrating a channel between RRUs according to an example of another embodiment of the present invention.

Optionally, in another optional embodiment based on the foregoing embodiments, a system for calibrating a channel between RRUs shown in FIG. 1 may include K RRUs. Signal quality values between each RRU and two neighboring RRUs in the K RRUs are greater than a preset threshold. The K RRUs form a chain structure. K≥3, and K is an integer. As shown in FIG. 7, FIG. 7 shows an example of a schematic diagram in which a system for calibrating a channel between RRUs includes six RRUs and the six RRUs form a chain structure.

Optionally, the signal quality value is a signal strength or a signal-to-noise ratio. A signal strength between two RRUs is a signal strength of a signal transmitted when one RRU transmits information with any channel in the other RRU by using any channel.

The preset threshold is a value preset in the system or is defined by a user. This is not limited in this embodiment.

Optionally, for the K RRUs that form the chain structure, signal quality values between at most two RRUs and only one neighboring RRU are greater than the preset threshold.

As shown in FIG. 7, signal quality values between each RRU in an RRU 720, an RRU 730, an RRU 740, and an RRU 750 and two neighboring RRUs are greater than the preset threshold. The RRU 720 is used as an example. Signal quality values between the RRU 720 and an RRU 710 and between the RRU 720 and the RRU 730 are greater than the preset threshold. Among the six RRUs, for the RRU 710, a signal quality value greater than the preset threshold exists only between the RRU 710 and the RRU 720, and for an RRU 760, a signal quality value greater than the preset threshold exists only between the RRU 760 and the RRU 750.

Optionally, if signal quality values between each RRU and two neighboring RRUs in the K RRUs are greater than the preset threshold, a BBU uses every alternate RRU in the K RRUs as a reference RRU, uses any channel in the reference RRU as a reference channel, and uses other RRUs in the K RRUs as a preset RRU. Each reference RRU is a reference RRU corresponding to two RRUs adjacent to the reference RRU, and K≥3.

The K RRUs are RRUs configured to cooperatively transmit a same signal to a same terminal device. It should be noted that a structure formed by the K RRUs belongs to a chain connection in this embodiment, provided that signal quality values between at most two RRUs and one connected RRU in the K RRUs are greater than the preset threshold, and that signal quality values between each RRU other than the at most two RRUs and two neighboring RRUs are greater than the preset threshold. In an actual system, signal quality values between each RRU and other several RRUs may also be greater than the preset threshold. This is not limited in this embodiment.

Figure 8A:
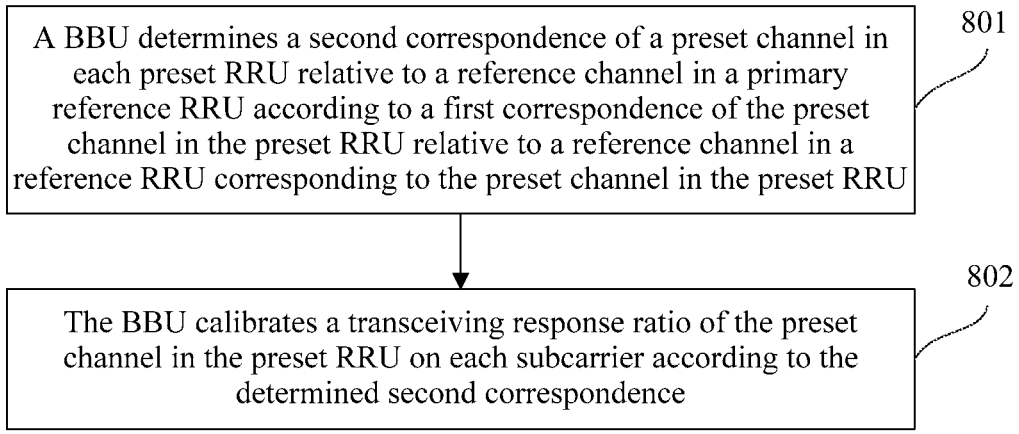
FIG. 8A is a flowchart of a method for calibrating a channel between RRUs according to an example of another embodiment of the present invention.

In the system for calibrating a channel between RRUs shown in FIG. 7, it is assumed that the BBU determines that an RRU1 710, an RRU3 730, and an RRU5 750 are reference RRUs, an RRU2 720, an RRU4 740, and an RRU6 760 are preset RRUs, the RRU1 710 is a reference RRU corresponding to the RRU2 720, the RRU3 730 is a reference RRU corresponding to the RRU2 720 and the RRU4 740, and the RRU5 750 is a reference RRU corresponding to the RRU4 740 and the RRU6 760. When the method for calibrating a channel between RRUs is applied to the system for calibrating a channel between RRUs shown in FIG. 7, the foregoing step 306 may be replaced with the following steps for implementation, as shown in FIG. 8A.

Step 801: A BBU determines a second correspondence of a preset channel in each preset RRU relative to a reference channel in a primary reference RRU according to a first correspondence of the preset channel in the preset RRU relative to a reference channel in a reference RRU corresponding to the preset channel in the preset RRU.

The second correspondence includes a correspondence between a frequency of each subcarrier in full bandwidth and a second calibration coefficient. The second calibration coefficient is a calibration coefficient of the preset channel in the preset RRU relative to the reference channel in the primary reference RRU on the subcarrier. The primary reference RRU is any RRU in K RRUs.

For a method for determining each first correspondence of the preset channel in each preset RRU relative to the reference channel in the reference RRU corresponding to the preset channel in each preset RRU, refer to step 302 to step 306 in the foregoing. Details are not repeated in the embodiment.

For example, in the foregoing example, the BBU determines that a calibration coefficient of a preset channel in a preset RRU2 relative to a reference channel in a reference RRU1 is $\alpha_{21}$, determines that a calibration coefficient of the preset channel in the preset RRU2 relative to a reference channel in a reference RRU3 is $\alpha_{23}$, determines that a calibration coefficient of a preset channel in a preset RRU4 relative to the reference channel in the reference RRU3 is $\alpha_{43}$, determines that a calibration coefficient of the preset channel in the preset RRU4 relative to a reference channel in a reference RRU5 is $\alpha_{45}$, and determines that a calibration coefficient of a preset channel in a preset RRU6 relative to the reference channel in the reference RRU5 is $\alpha_{65}$.

When the RRU3 is determined as the primary reference RRU, on each subcarrier, $$\alpha_{23} = \frac{G_3}{G_2},$$

where $G_3$ indicates a transceiving response ratio of a preset channel in the RRU3, $G_2$ indicates a transceiving response ratio of the preset channel in the RRU2, and $$\alpha_{21} = \frac{G_1}{G_2},$$

where $G_1$ indicates a transceiving response ratio of a preset channel in the RRU1. In this way, a calibration coefficient of the preset channel in the RRU1 relative to the reference channel in the primary reference RRU3 on each subcarrier is determined as $$\frac{G_3}{G_1} = \frac{\alpha_{23}}{\alpha_{21}}.$$

Therefore, a second correspondence of the preset channel in the preset RRU1 relative to the reference channel in the primary reference RRU is determined as a ratio of a first correspondence of the preset channel in the preset RRU2 relative to the reference channel in the reference RRU3 to a first correspondence of the preset channel in the preset RRU2 relative to the reference channel in the reference RRU1. The BBU determines the second correspondence of the preset channel in each preset RRU relative to the reference channel in the primary reference RRU according to the foregoing method.

Step 802: The BBU calibrates a transceiving response ratio of the preset channel in the preset RRU on each subcarrier according to the determined second correspondence.

Figure 8B:
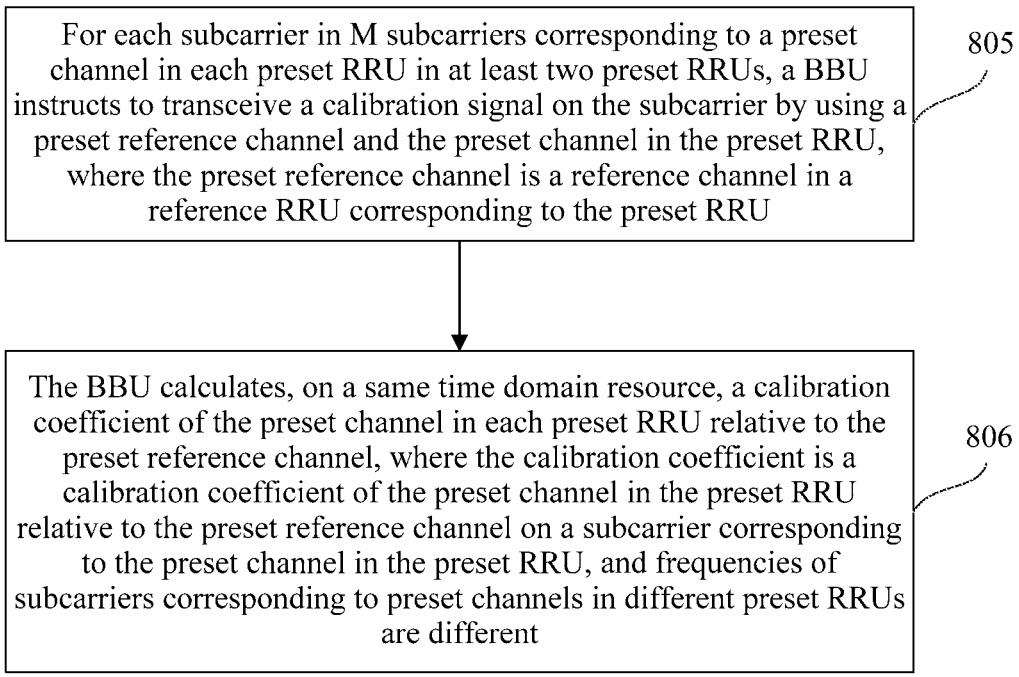
FIG. 8B is a flowchart of a method for calibrating a channel between RRUs according to an example of another embodiment of the present invention.

Optionally, in another optional embodiment based on the foregoing embodiment, when K RRUs include at least two preset RRUs, the foregoing step 301 may be replaced with the following steps for implementation, as shown in FIG. 8B.

Step 805: For each subcarrier in M subcarriers corresponding to a preset channel in each preset RRU in at least two preset RRUs, a BBU instructs to transceive a calibration signal on the subcarrier by using a preset reference channel and the preset channel in the preset RRU, where the preset reference channel is a reference channel in a reference RRU corresponding to the preset RRU.

Frequencies of M subcarriers corresponding to preset channels in different preset RRUs are different. Quantities of the M subcarriers corresponding to the preset channels in the different preset RRUs are the same or different. That is, values of M may be the same or different. The preset channels in the different preset RRUs are corresponding to a same preset reference channel or different preset reference channels.

Optionally, the BBU instructs the reference RRU to transceive, on a same time domain resource and on subcarriers corresponding to preset channels in the at least two preset RRUs, the calibration signal by separately using the reference channels in the reference RRUs corresponding to the at least two preset RRUs and the preset channels in the at least two preset RRUs. One preset RRU is corresponding to one or two reference RRUs. When one preset RRU is corresponding to two reference RRUs, frequencies of subcarriers and quantities of the subcarriers corresponding to a preset channel in a same preset RRU relative to reference channels in different reference RRUs may be different, and the BBU instructs the two reference RRUs to transceive, on the same time domain resource, the calibration signal on different subcarriers by using reference channels in the two reference RRUs and the preset channel in the preset RRU.

For example, a preset RRU2 720, a preset RRU4 740, and a preset RRU6 760 included in the system for calibrating a channel between RRUs shown in FIG. 7 each include only one preset channel, and a channel 0 in each preset RRU is the preset channel.

A channel 0 in the preset RRU2 720 relative to a reference RRU1 710 is corresponding to two subcarriers whose frequencies are respectively 15 kHZ and 30 kHZ. A channel 0 in the preset RRU2 720 relative to a reference RRU3 730 is corresponding to two subcarriers whose frequencies are respectively 45 kHZ and 60 kHZ. A channel 0 in the preset RRU4 740 relative to the reference RRU3 730 is corresponding to two subcarriers whose frequencies are respectively 75 kHZ and 90 kHZ. A channel 0 in the preset RRU4 740 relative to a reference RRU5 750 is corresponding to three subcarriers whose frequencies are respectively 105 kHZ, 120 kHZ, and 135 kHZ. A channel 0 in the preset RRU6 760 relative to the reference RRU5 750 is corresponding to two subcarriers whose frequencies are respectively 150 kHZ and 165 kHZ.

In a GP interval of a special subframe of a first radio frame in an LTE TDD system, the BBU instructs to transceive the calibration signal on the subcarriers with the frequencies 15 kHZ and 30 kHZ by using a reference channel in the reference RRU1 corresponding to the preset RRU2 and a preset channel in the preset RRU2, instructs to transceive the calibration signal on the subcarriers with the frequencies 45 kHZ and 60 kHZ by using a reference channel in the reference RRU3 corresponding to the preset RRU2 and the preset channel in the preset RRU2, instructs to transceive the calibration signal on the subcarriers with the frequencies 75 kHZ and 90 kHZ by using a reference channel in the reference RRU3 corresponding to the preset RRU4 and a preset channel in the preset RRU4, instructs to transceive the calibration signal on the subcarriers with the frequencies 105 kHZ, 120 kHZ, and 135 kHZ by using a reference channel in the reference RRU5 corresponding to the preset RRU4 and the preset channel in the preset RRU4, and instructs to transceive the calibration signal on the subcarriers with the frequencies 150 kHZ and 165 kHZ by using a reference channel in the reference RRU5 corresponding to the preset RRU6 and a preset channel in the preset RRU6.

Optionally, any preset RRU in the at least two RRUs includes one or more preset channels. When one preset RRU includes multiple preset channels, frequencies of subcarriers corresponding to different preset channels in different preset RRUs are different, and quantities of corresponding subcarriers are the same or different. Then the BBU instructs to transceive, on the same time domain resource and on subcarriers corresponding to multiple preset channels in multiple preset RRUs, the calibration signal by using a reference RRU corresponding to the preset RRU and the multiple preset channels in the multiple preset RRUs.

Step 806: The BBU calculates, on a same time domain resource, a calibration coefficient of the preset channel in each preset RRU relative to the preset reference channel, where the calibration coefficient is a calibration coefficient of the preset channel in the preset RRU relative to the preset reference channel on a subcarrier corresponding to the preset channel in the preset RRU, and frequencies of subcarriers corresponding to preset channels in different preset RRUs are different.

In the foregoing example, the BBU calculates, on the same time domain resource, calibration coefficients of the preset channel in the preset RRU2 relative to the reference channel in reference RRU1 on the subcarriers with the frequencies 15 kHZ and 30 kHZ, calculates calibration coefficients of the preset channel in the preset RRU2 relative to the reference channel in the reference RRU3 on the subcarriers with the frequencies 45 kHZ and 60 kHZ, calculates calibration coefficients of the preset channel in the preset RRU4 relative to the reference channel in the reference RRU3 on the subcarriers with the frequencies 75 kHZ and 90 kHZ, calculates calibration coefficients of the preset channel in the preset RRU4 relative to the reference channel in the reference RRU5 on the subcarriers with the frequencies 105 kHZ, 120 kHZ, and 135 kHZ, and calculates calibration coefficients of the preset channel in the preset RRU6 relative to the reference channel in the reference RRU5 on the subcarriers with the frequencies 150 kHZ and 165 kHZ.

It should be noted that, during actual implementation, in the foregoing step 805, when the BBU instructs to transceive the calibration signal on the subcarrier by using the preset reference channel and the preset channel in the preset RRU, a preset reference channel may be different for different preset RRUs. When one preset RRU includes multiple preset channels, a preset reference channel may also be different for different preset channels in the preset RRU. If the reference RRU does not perform self-calibration, that is, transceiving response ratios of different reference channels are different, after a first correspondence of a preset channel relative to a reference channel corresponding to the preset channel is determined, the reference RRU performs self-calibration, so that all channels in the preset RRU have the same transceiving response ratio as all channels in the reference RRU. For a specific implementation method, refer to the method shown in the embodiment shown in FIG. 3, and details are not repeated in this embodiment.

In conclusion, according to the method for calibrating a channel between RRUs provided in the embodiment of the present invention, preset channels in multiple preset RRUs use M different subcarriers, so that a BBU can instruct to transceive a calibration signal concurrently on different subcarriers by using a reference channel in a reference RRU and the preset channels in the multiple preset RRUs at the same time, so as to concurrently determine and obtain multiple first correspondences, and can calibrate transceiving response ratios of multiple channels in the preset RRUs according to the determined first correspondences. This resolves a problem of a relatively long calibration period caused when transceiving response ratios of channels of a relatively large quantity of preset RRUs need to be successively calibrated, implements that multiple pairs of RRUs can transceive a calibration signal at the same time and do not interfere with each other, and reduces a calibration period.

Figure 9:
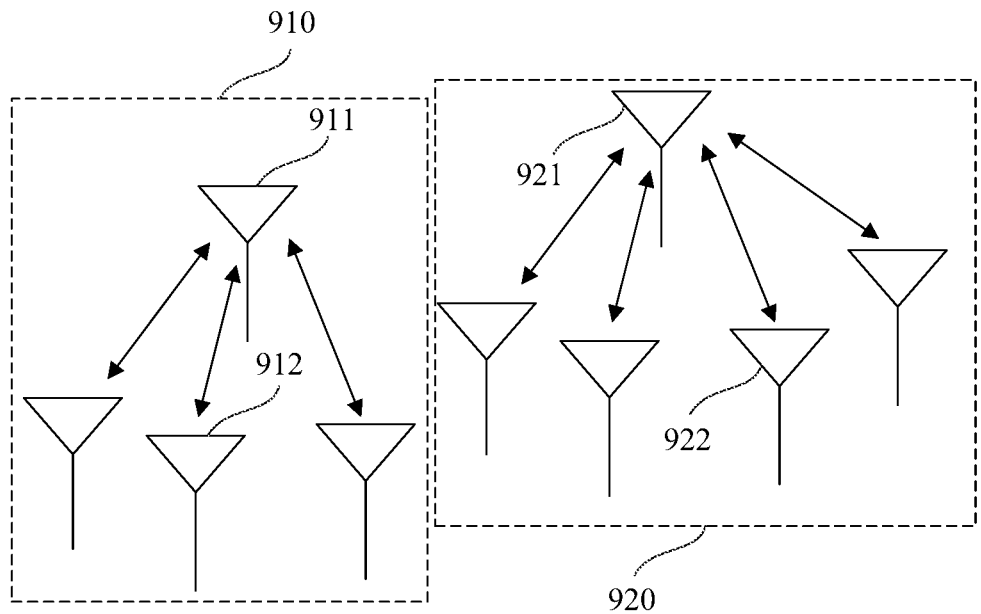
FIG. 9 is a schematic structural diagram of a system for calibrating a channel between RRUs according to an example of another embodiment of the present invention.

In another optional embodiment based on the foregoing embodiment, the foregoing method may be used between RRUs in multiple adjacent clusters at the same time to calibrate a transceiving response ratio of a channel. A cluster is a set of RRUs whose required transceiving response ratio of channels are the same. A schematic structural diagram of the multiple adjacent clusters is shown in FIG. 9.

A cluster 910 and a cluster 920 are two adjacent clusters. One cluster may include one or more preset RRUs. When one cluster includes multiple preset RRUs, RRUs in the cluster may form a star structure shown in FIG. 5, a chain structure shown in FIG. 7, or another communications structure. Communications structures of RRUs in different clusters may be the same or different. This is not limited in this embodiment. FIG. 9 shows an example of a schematic diagram in which RRUs in the cluster 910 and RRUs in the cluster 920 each form a star structure.

Quantities of RRUs included in different clusters may be the same or different. RRUs in a same cluster are configured to cooperatively transmit a same signal to a same terminal device. RRUs in different clusters are configured to transmit different signals to different terminals.

A transceiving response ratio of a preset channel in each preset RRU, which is included in each cluster in the multiple adjacent clusters, relative to a reference channel in a reference RRU in the cluster is calibrated by using the method shown in the embodiment in FIG. 6 or shown in the embodiments in FIG. 8A and FIG. 8B.

Frequencies of M subcarriers corresponding to a preset channel in a preset RRU in a cluster are different from frequencies of subcarriers corresponding to channels in RRUs in a cluster adjacent to the cluster in which the preset RRU is located.

For example, for the cluster 910, a calibration signal is transceived by using a reference channel in a reference RRU 911 and a preset channel in a preset RRU 912 on subcarriers that are corresponding to the preset RRU 912 and whose frequencies are 15 kHZ, 30 kHZ, and 45 kHZ. For the cluster 920, a calibration signal is transceived on a same time domain resource by using a reference channel in a reference RRU 921 and a preset channel in a preset RRU 922 on subcarriers that are corresponding to the preset RRU 922 and whose frequencies are 60 kHZ, 75 kHZ, and 90 kHZ.

In conclusion, according to the method for calibrating a channel between RRUs provided in the embodiment of the present invention, frequencies of subcarriers corresponding to channels in RRUs in multiple clusters are different. This implements that RRUs in adjacent clusters can transceive a calibration signal at the same time and do not interfere with each other, and reduces interference of the calibration signal between the RRUs in the adjacent clusters.

Figure 10:
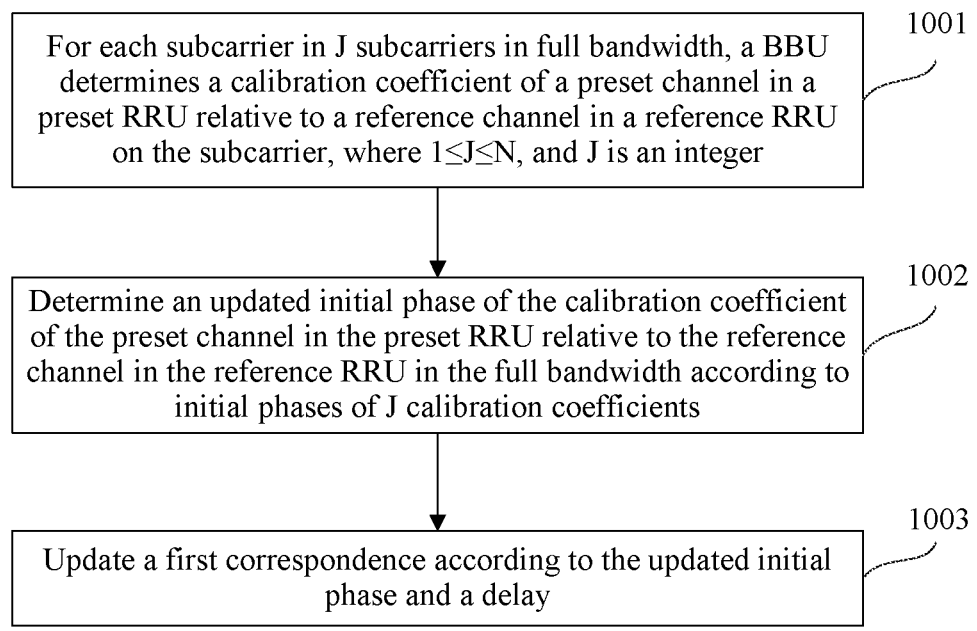
FIG. 10 is a flowchart of a method for calibrating a channel between RRUs according to an example of another embodiment of the present invention.

In another optional embodiment based on the foregoing embodiments, when a delay changes, the method further includes the following steps, as shown in FIG. 10.

Step 1001: For each subcarrier in J subcarrier(s) in full bandwidth, a BBU determines a calibration coefficient of a preset channel in a preset RRU relative to a reference channel in a reference RRU on the subcarrier, where $1 \leq J \leq N$, and J is an integer.

Optionally, for each subcarrier in the J subcarrier(s) in the full bandwidth, the BBU determines the calibration coefficient of the preset channel in the preset RRU relative to the reference channel in the reference RRU on the subcarrier at a predetermined time interval. A length of the predetermined time interval is preset in a system or is defined by a user. This is not limited in this embodiment.

A delay changes due to a change in factors such as an electric field and a temperature in an environment, so that the calibration coefficient changes, and a first correspondence also changes. A phase of the first correspondence is $\varphi_{fn}=2\pi f_n * \tau + \varphi_0$. During actual implementation, $\varphi_0 = 2\pi f_c * \tau$. $f_n$ is a frequency of a subcarrier, and $f_c$ is a carrier frequency of a high frequency carrier used by an RRU for modulation. Generally, the high frequency carrier has a high frequency such as 2.5 GHz or 2.6 GHz. However, the frequency $f_n$ of the subcarrier is usually a low frequency such as 15 kHZ, 30 kHz, or 45 kHZ. Carrier frequency $f_c$ of the high frequency carrier>>frequency $f_n$ of the subcarrier. Therefore, when the delay $\tau$ changes, $\Delta 2\pi f_c * \tau >> \Delta 2\pi f_n * \tau$. That is, $\Delta \varphi_0 >> \Delta 2\pi f_n * \tau$. An initial phase $\varphi_0$ changes much more, and there is greater impact on the first correspondence. When the first correspondence is updated, to reduce a calculation amount within an error range, an update can be made only to $\varphi_0$.

It should be noted that the first correspondence in this embodiment may be a first correspondence that is determined by transceiving a calibration signal on some subcarriers by using the method provided in the embodiments shown in FIG. 2 to FIG. 9, or may be a first correspondence that is obtained by means of calculation by transceiving a calibration signal in full bandwidth by using the prior art. This is not limited in this embodiment.

For each subcarrier in the J subcarrier(s), a method for determining the calibration coefficient of the preset channel in the preset RRU relative to the reference channel in the reference RRU on the subcarrier may be determined by the method shown in the foregoing step 301.

Step 1002: Determine an updated initial phase of the calibration coefficient of the preset channel in the preset RRU relative to the reference channel in the reference RRU in the full bandwidth according to initial phase(s) of J calibration coefficient(s).

For a specific method for implementing this step, refer to the foregoing step 303, and details are not repeated in this embodiment.

Step 1003: Update a first correspondence according to the updated initial phase and a delay.

For a specific method for implementing this step, refer to the foregoing step 304 and step 305, and details are not repeated in this embodiment.

In conclusion, according to the method for calibrating a channel between RRUs provided in the embodiment of the present invention, when a delay changes, it can be determined to update a first correspondence only by re-measuring an initial phase of a calibration coefficient, without re-transceiving a calibration signal on a subcarrier and then determining a new first correspondence. This reduces a processing operation amount of a BBU.

Figure 11:
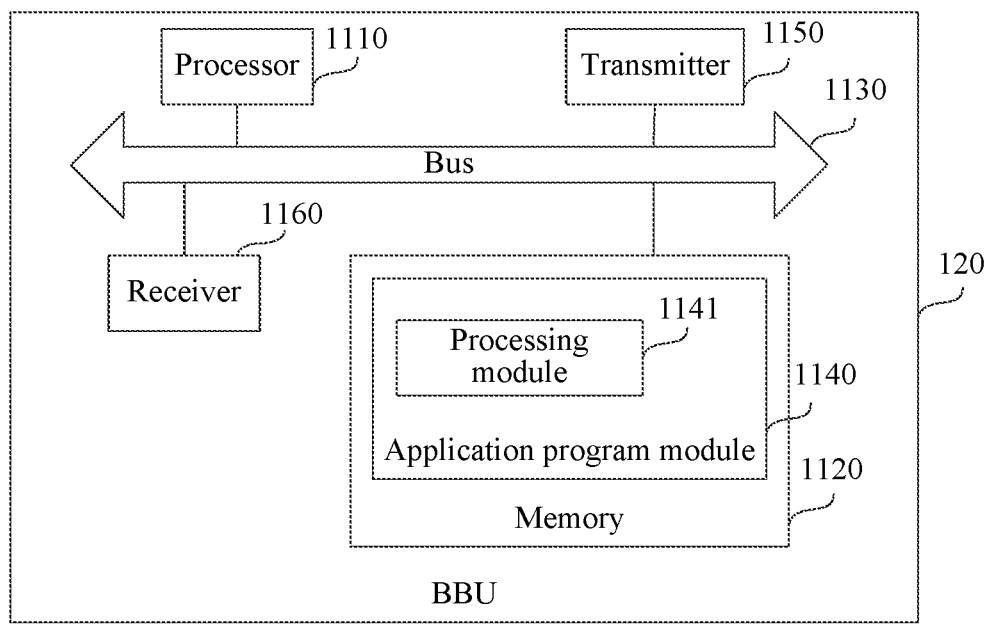
FIG. 11 is a schematic structural diagram of an apparatus for calibrating a channel between RRUs according to an example of an embodiment of the present invention.

Referring to FIG. 11, FIG. 11 shows a schematic structural diagram of an apparatus for calibrating a channel between RRUs according to an example of an embodiment of the present invention. The apparatus for calibrating a channel between RRUs may be implemented by hardware, software, or their combination, as an entire BBU or a part of a BBU. The apparatus for calibrating a channel between RRUs includes a processor 1110, a memory 1120 connected to the processor 1110, and a bus 1130. A person skilled in the art may understand that a structure of the apparatus for calibrating a channel between RRUs shown in FIG. 11 constitutes no limitation on the apparatus for calibrating a channel between RRUs. The apparatus for calibrating a channel between RRUs may include more or fewer components than those shown in the figure, or components may be combined, or different component arrangements are used. For example, the apparatus for calibrating a channel between RRUs further includes a transmitter 1150, a receiver 1160, a power supply (not shown in FIG. 11), and the like.

The processor 1110 is a control center of the apparatus for calibrating a channel between RRUs, connecting all parts of the entire apparatus for calibrating a channel between RRUs by using various interfaces and lines, and executes various functions of the apparatus for calibrating a channel between RRUs and processes data by running or executing a software program and/or a module stored in the memory 1120 and by invoking data stored in the memory 1120. Optionally, the processor 1110 may include one or more processing cores. Optionally, the processor 1110 may be integrated with an application processor and a modem processor. The application processor mainly processes an operating system, a user interface, an application program, and the like. The modem processor mainly processes wireless communications. It may be understood that the foregoing modem processor may be not integrated into the processor 1110, and the foregoing modem processor may be implement as an independent chip.

The memory 1120 is connected to the processor 1110 by using the bus 1130.

The memory 1120 may be configured to store the software program and the module. The processor 1110 performs various functional applications and processes data by running the software program and the module stored in the memory 1120. The memory 1120 may store an application program module 1140 of at least one function. The application program module 1140 may include a processing module 1141. The processor 1110 performs, by invoking the module stored in the memory 1120, the method for calibrating a channel between RRUs in the foregoing embodiments.

In addition, the memory 1120 may be implemented by any type of a volatile storage device or a non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), or a magnetic memory.

Figure 12:
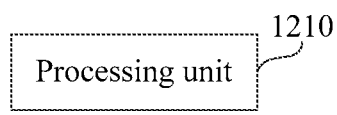
FIG. 12 is a schematic structural diagram of an apparatus for calibrating a channel between RRUs according to an example of an embodiment of the present invention.

Referring to FIG. 12, FIG. 12 shows a schematic structural diagram of an apparatus for calibrating a channel between RRUs according to an embodiment of the present invention. The apparatus may be implemented by hardware, software, or their combination, as an entire BBU or a part of a BBU. As shown in FIG. 12, the apparatus for calibrating a channel between RRUs may include a processing unit 1210.

The processing unit 1210 is configured to: for each subcarrier in M subcarriers in full bandwidth, instruct a reference RRU to transceive a calibration signal on the subcarrier by using a reference channel and a preset channel in a preset RRU, and calculate a calibration coefficient of the preset channel in the preset RRU relative to the reference channel in the reference RRU on the subcarrier, where $2 \leq M < N$, N is a total quantity of subcarriers in the full bandwidth, and both M and N are integers.

The processing unit 1210 is further configured to determine a first correspondence according to M calibration coefficients obtained by means of calculation, where the first correspondence includes a correspondence between a frequency of each subcarrier in the full bandwidth and a first calibration coefficient, and the first calibration coefficient is the calibration coefficient of the preset channel in the preset RRU relative to the reference channel in the reference RRU on the subcarrier.

The processing unit 1210 is further configured to calibrate a transceiving response ratio of the preset channel in the preset RRU on each subcarrier according to the first correspondence.

Optionally, the processing unit 1210 is further configured to determine an initial phase and a delay of a calibration coefficient of the preset channel in the preset RRU relative to the reference channel in the reference RRU in the full bandwidth according to the M calibration coefficients.

The processing unit 1210 is further configured to determine the first correspondence according to the initial phase and the delay.

Optionally, the processing unit 1210 is further configured to: for each calibration coefficient in the M calibration coefficients, determine a phase of the calibration coefficient.

The processing unit 1210 is further configured to determine the initial phase and the delay of the calibration coefficient of the preset RRU relative to the reference channel in the reference RRU in the full bandwidth according to M phases and a frequency of the subcarrier corresponding to each calibration coefficient.

Optionally, the processing unit 1210 is further configured to determine phases $\varphi_{f_n}$ of the calibration coefficients of the preset RRU relative to the reference channel in the reference RRU in the full bandwidth according to the initial phase, the delay, and frequencies $f_n$ of the N subcarriers, where $1 \leq n \leq N$, and n is an integer.

The processing unit 1210 is further configured to determine the first correspondence according to the phases $\varphi_{f_n}$.

Optionally, a difference between frequencies of any two subcarriers in the M subcarriers is less than a preset frequency threshold.

Optionally, the preset RRU includes at least two preset channels. The processing unit 1210 is further configured to calculate, on a same time domain resource, a calibration coefficient of each preset channel relative to the reference channel in the reference RRU on a subcarrier corresponding to the preset channel, where frequencies of subcarriers corresponding to different preset channels in the preset RRU are different.

Optionally, the processing unit 1210 is further configured to: if a signal quality value between at least one RRU and other RRUs in K RRUs is greater than a preset threshold, use an RRU with a largest signal quality value between the RRU and the other RRUs in the K RRUs, as the reference RRU, use any channel in the reference RRU as the reference channel, and use the other RRUs in the K RRUs as the preset RRU, where $K \geq 3$, and K is an integer.

Optionally, at least two preset RRUs are included. The processing unit 1210 is further configured to calculate, on the same time domain resource, a calibration coefficient of a preset channel in each preset RRU relative to the reference channel in the reference RRU on a subcarrier corresponding to the preset channel in the preset RRU, where frequencies of subcarriers corresponding to preset channels in different preset RRUs are different.

Optionally, the processing unit 1210 is further configured to: if signal quality values between each RRU and two neighboring RRUs in K RRUs are greater than a preset threshold, use every alternate RRU in the K RRUs as the reference RRU, use any channel in the reference RRU as the reference channel, and use other RRUs in the K RRUs as the preset RRU, where each reference RRU is a reference RRU corresponding to two RRUs adjacent to the reference RRU, and $K \geq 3$.

The processing unit 1210 is further configured to determine a second correspondence of a preset channel in each preset RRU relative to a reference channel in a primary reference RRU according to a first correspondence of the preset channel in the preset RRU relative to a reference channel in a reference RRU corresponding to the preset channel in the preset RRU, where the second correspondence includes a correspondence between the frequency of each subcarrier in the full bandwidth and a second calibration coefficient, the second calibration coefficient is a calibration coefficient of the preset channel in the preset RRU relative to the reference channel in the primary reference RRU on the subcarrier, and the primary reference RRU is any RRU in the K RRUs.

The processing unit 1210 is further configured to calibrate the transceiving response ratio of the preset channel in the preset RRU on each subcarrier according to the determined second correspondence.

Optionally, at least two preset RRUs are included. The processing unit 1210 is further configured to calculate, on the same time domain resource, a calibration coefficient of the preset channel in each preset RRU relative to a preset reference channel, where the calibration coefficient is a calibration coefficient of the preset channel in the preset RRU relative to the preset reference channel on a subcarrier corresponding to the preset channel in the preset RRU, the preset reference channel is a reference channel in a reference RRU corresponding to the preset RRU, and frequencies of subcarriers corresponding to preset channels in different preset RRUs are different.

Optionally, frequencies of the M subcarriers corresponding to the preset channel in the preset RRU are different from frequencies of subcarriers corresponding to channels in RRUs in a cluster adjacent to a cluster in which the preset RRU is located, and a cluster is a set of RRUs whose required transceiving response ratio of channels are the same.

Optionally, the processing unit 1210 is further configured to: for each subcarrier in J subcarrier(s) in the full bandwidth, calculate a calibration coefficient of the preset channel in the preset RRU relative to the reference channel in the reference RRU on the subcarrier, where $1 \leq J \leq N$, and J is an integer.

The processing unit 1210 is further configured to determine an updated initial phase of the calibration coefficient of the preset channel in the preset RRU relative to the reference channel in the reference RRU in the full bandwidth according to initial phase(s) of J calibration coefficient(s).

The processing unit 1210 is further configured to update the first correspondence according to the updated initial phase and the delay.

In conclusion, according to the apparatus for calibrating a channel between RRUs provided in the embodiment of the present invention, a BBU only needs to instruct a reference RRU to transceive a calibration signal on some subcarriers in a full bandwidth by using a reference channel and a preset channel in a preset RRU, and obtain calibration coefficients, so that the BBU can determine a calibration coefficient of the preset channel in the preset RRU relative to the reference channel in the reference RRU in the full bandwidth, and calibrate a transceiving response ratio of the preset channel in the preset RRU in the full bandwidth. This resolves a problem of relatively high resource consumption caused because a calibration signal needs to be transceived on each subcarrier during calibration a channel between RRUs, and reduces resource consumption. In addition, the calibration signal needs to be transmitted only on some subcarriers, thereby reducing power of the calibration signal.

It should be understood that, unless otherwise clearly specified in the context, a singular form "a" ("a", "an", "the) used in this specification is also intended to include a plural form. It should be further understood that "and/or" used in this specification is any or all possible combinations including one or more listed related items.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

Additionally, statements made herein characterizing the invention refer to an embodiment of the invention and not necessarily all embodiments.

What is claimed is:

1. A method for calibrating a channel between radio remote units (RRUs), wherein the method comprises:
    for each subcarrier of M subcarriers of an operating bandwidth of a system:
        instructing, by a baseband unit (BBU), a reference RRU to send, by using a reference channel, a respective first calibration signal on the respective subcarrier to a preset channel in a preset RRU;
        instructing, by the BBU, the preset RRU to send a respective second calibration signal to the reference channel in the reference RRU; and
        calculating, by the BBU and based on the respective first calibration signal and the respective second calibration signal, a respective calibration coefficient of the preset channel in the preset RRU relative to the reference channel in the reference RRU for the respective subcarrier;
    determining, by the BBU, according to the calculated calibration coefficients for the M subcarriers, respective calibration coefficients for all N subcarriers of the operating bandwidth of the system, wherein $2 \leq M < N$, N is a total quantity of subcarriers of the operating bandwidth of the system, and both M and N are integers; and
    calibrating, by the BBU, a respective transceiving response ratio of the preset channel in the preset RRU for each of the N subcarriers according to the respective calibration coefficients for the N subcarriers.

2. The method according to claim 1, wherein determining the respective calibration coefficients for the N subcarriers comprises:
    determining, by the BBU and according to the calculated calibration coefficients for the M subcarriers, an initial phase and a delay; and
    determining, by the BBU, at least one respective calibration coefficient for at least one respective subcarrier of the N subcarriers according to the initial phase and the delay.

3. The method according to claim 2, wherein determining the initial phase and the delay comprises:
    for each respective calibration coefficient of the calculated calibration coefficients for the M subcarriers, determining, by the BBU, a phase of the respective calibration coefficient; and
    determining, by the BBU, the initial phase and the delay according to M phases and respective frequencies of the M subcarriers.

4. The method according to claim 2, wherein determining the respective calibration coefficients for the N subcarriers according to the initial phase and the delay comprises:
    determining, by the BBU, phases $\varphi_{fn}$ corresponding to the N subcarriers according to the initial phase, the delay, and frequencies $f_n$ of the N subcarriers; and
    determining, by the BBU, the respective calibration coefficients for the N subcarriers according to the phases $\varphi_{fn}$.

5. The method according to claim 2, wherein the method further comprises:
    for each respective subcarrier of J subcarrier(s) of the operating bandwidth of the system, calculating, by the BBU, a respective calibration coefficient for the respective subcarrier of the J subcarrier(s), wherein $1 \leq J \leq N$, and J is an integer;

determining, by the BBU, an updated initial phase according to initial phase(s) of J calibration coefficient(s); and updating, by the BBU, the respective calibration coefficients for the N subcarriers according to the updated initial phase.

6. The method according to claim 1, wherein a difference between frequencies of any two subcarriers of the M subcarriers is less than a preset frequency threshold.

7. The method according to claim 1, wherein the method further comprises:

based on a signal quality value between at least one RRU and other RRUs of K RRUs being greater than a preset threshold, using, by the BBU, an RRU with a largest signal quality value between the RRU and the other RRUs of the K RRUs as the reference RRU, using a channel in the reference RRU as the reference channel, and using another RRU of the K RRUs as the preset RRU, wherein K≥3, and K is an integer.

8. The method according to claim 1, wherein frequencies of the M subcarriers corresponding to the preset channel in the preset RRU are different from frequencies of subcarriers corresponding to channels in RRUs in a cluster adjacent to a cluster in which the preset RRU is located, and a cluster is a set of RRUs whose required transceiving response ratio of channels are the same.

9. A non-transitory memory having processor-executable instructions stored thereon for calibrating a channel between radio remote units (RRUs), wherein the processor-executable instructions are executable by a processor to carry out the following:

for each subcarrier of M subcarriers of an operating bandwidth of a system:

instructing a reference RRU to send, by using a reference channel, a respective first calibration signal on the respective subcarrier to a preset channel in a preset RRU;

instructing the preset RRU to send a respective second calibration signal to the reference channel in the reference RRU; and calculating, based on the respective first calibration signal and the respective second calibration signal, a respective calibration coefficient of the preset channel in the preset RRU relative to the reference channel in the reference RRU for the respective subcarrier;

determining, according to the calculated calibration coefficients for the M subcarriers, respective calibration coefficients for all N subcarriers of the operating bandwidth of the system, wherein 2≤M<N, N is a total quantity of subcarriers of the operating bandwidth of the system, and both M and N are integers; and calibrating a respective transceiving response ratio of the preset channel in the preset RRU for each of the N subcarriers according to the respective calibration coefficients for the N subcarriers.

10. The non-transitory memory according to claim 9, wherein determining respective calibration coefficients for the N subcarriers comprises:

determining, according to the calculated calibration coefficients for the M subcarriers, an initial phase and a delay; and determining at least one respective calibration coefficient for at least one respective subcarrier of the N subcarriers according to the initial phase and the delay.

11. The non-transitory memory according to claim 10, wherein determining the initial phase and the delay comprises:

for each respective calibration coefficient of the calculated calibration coefficients for the M subcarriers, determining a phase of the respective calibration coefficient; and determining the initial phase and the delay according to M phases and respective frequencies of the M subcarriers.

12. The non-transitory memory according to claim 10, wherein determining the respective calibration coefficients for the N subcarriers comprises:

determining phases $\varphi_{f_n}$ corresponding to the N subcarriers according to the initial phase, the delay, and frequencies $f_n$ of the N subcarriers; and determining the respective calibration coefficients for the N subcarriers according to the phases $\varphi_{f_n}$.

13. The non-transitory memory according to claim 10, wherein the processor-executable instructions are further executable by the processor to carry out the following:

for each respective subcarrier of J subcarrier(s) of the operating bandwidth of the system, calculating a respective calibration coefficient for the respective subcarrier of the J subcarrier(s), wherein 1≤J≤N, and J is an integer;

determining an updated initial phase according to initial phase(s) of J calibration coefficient(s); and updating the respective calibration coefficients for the N subcarriers according to the updated initial phase.

14. The non-transitory memory according to claim 9, wherein a difference between frequencies of any two subcarriers of the M subcarriers is less than a preset frequency threshold.

15. The non-transitory memory according to claim 9, wherein the processor-executable instructions are further executable by the processor to carry out the following:

based on a signal quality value between at least one RRU and other RRUs of K RRUs being greater than a preset threshold, using an RRU with a largest signal quality value between the RRU and the other RRUs of the K RRUs as the reference RRU, using a channel in the reference RRU as the reference channel, and using another RRU of the K RRUs as the preset RRU, wherein K≥3, and K is an integer.

16. The non-transitory memory according to claim 9, wherein frequencies of the M subcarriers corresponding to the preset channel in the preset RRU are different from frequencies of subcarriers corresponding to channels in RRUs in a cluster adjacent to a cluster in which the preset RRU is located, and a cluster is a set of RRUs whose required transceiving response ratio of channels are the same.

* * * * *